INFORMATION STORAGE AND RETRIEVAL SYSTEM

Filed July 3, 1961 8 Sheets-Sheet 1

INVENTORS
John D. Campbell
Herbert S. Caron
William Grobman
BY William Grobman
Lawrence I Field
ATTORNEYS

INFORMATION STORAGE AND RETRIEVAL SYSTEM

Filed July 3, 1961

8 Sheets-Sheet 2

INVENTORS
John D. Campbell
Herbert S. Caron
William Grobman

BY William Grobman
Lawrence I Field
ATTORNEYS

INFORMATION STORAGE AND RETRIEVAL SYSTEM

INVENTORS
John D. Campbell
Herbert S. Caron
William Grobman
BY William Grobman
Lawrence I Field
ATTORNEYS

INFORMATION STORAGE AND RETRIEVAL SYSTEM

Filed July 3, 1961 8 Sheets-Sheet 4

INVENTORS
John D. Campbell
Herbert S. Caron
William Grobman
BY William Grobman
Lawrence J. Field
ATTORNEYS Sept. 1, 1970 J. D. CAMPBELL ET AL 3,526,755

INFORMATION STORAGE AND RETRIEVAL SYSTEM

Filed July 3, 1961 8 Sheets-Sheet 5

INVENTORS
John D. Campbell
Herbert S. Caron
William Grobman

BY William Grobman

Lawrence I. Field

ATTORNEYS

INFORMATION STORAGE AND RETRIEVAL SYSTEM

INVENTORS
John D. Campbell
Herbert S. Caron
William Grobman
BY William Grobman
Lawrence I Field
ATTORNEYS INVENTORS
John D. Campbell
Herbert S. Caron
William Grobman
BY William Grobman
Lawrence I. Field ATTORNEYS Sept. 1, 1970 J. D. CAMPBELL ET AL 3,526,755

INFORMATION STORAGE AND RETRIEVAL SYSTEM

Filed July 3, 1961 8 Sheets-Sheet 8

INVENTORS
John D. Campbell
Herbert S. Caron
William Grobman

BY William Grobman
Lawrence I. Field ATTORNEYS

United States Patent Office 3,526,755
Patented Sept. 1, 1970

3,526,755
INFORMATION STORAGE AND RETRIEVAL SYSTEM

John D. Campbell, 11568 W. Hill Drive, Rockville, Md. 20852; Herbert S. Caron, 8900 Evergreen Drive, Parma, Ohio 44129; and William Grobman, Silver Spring, Md. (12400 Salem Lane, Bowie, Md. 20715)

Filed July 3, 1961, Ser. No. 121,541
Int. Cl. G06k 7/015
U.S. Cl. 235—61.11 21 Claims

ABSTRACT OF THE DISCLOSURE

Apparatus is provided for simultaneously reading information entered in a plurality of record receivers. Each record receiver represents an individual dimension and is divided so that information in several categories of the dimension may be separately recorded. The same information or recording position in each category on each record receiver represents the same subject about which the information is being recorded. Several record receivers are arranged to be simultaneously read with only one category of each of the dimensions being read at one time. Counters and recording means indicate whenever there is coincidence of information in any position in the combination of categories being read. The combinations of categories being read can be changed at will to provide information of many combinations of categories.

This invention relates to information storage and retrieval systems, and, more particularly, to systems in which information can be stored in one routine and from which it can be retrieved in another routine.

The use of information storage systems in business and scientific applications is becoming more and more popular, particularly where large quantities of information must be continually scanned for recovery of individual items of information. In such large file systems, the high speed of automatic mechanical and electronic equipment saves considerable time and reduces the amount of trained personnel needed to staff a large installation. In addition, information processing systems in which either large masses of information must be manipulated or in which information must be manipulated a large number of times are also becoming popular as time saving devices.

In addition to the large installations in which high speed automatic equipment is required, there is also an area in which smaller equipment, operating at lower speeds, is useful. Such equipment is usually custom designed for the needs of the particular installation in which it is to be used. Custom design and installation is always expensive, and often results in large and cumbersome apparatus, especially where existing devices are modified to perform a task for which they were not originally designed. Yet, there are many groups of tasks for which limited capacity and relatively slow information handling equipment could be profitably designed and used without going to completely customized systems.

In many forms of research, a large number of specimens are examined for the same characteristics. The characteristics are then studied in all of their combinations and permutations possible within the time allotted for the research to uncover trends or causes. In medical and psychological studies, for example, groups of persons are interviewed, and the information obtained from each person is entered onto standard forms. When it later becomes necessary to review this information, such review is almost always limited to a few characteristics and the extent to which they exist in each or all of the persons interviewed. Presently, it is necessary to process all of the forms for all of the persons, selecting one of the characteristics being studied. After the forms containing this characteristic have been segregated from the remainder of the forms, the selected group is then again reviewed for the second charatceristic. This procedure is repeated until all of the characteristics under consideration have been sorted. Then, and only then, is the number of individuals in which all of the characteristics exist determinable. When the large number of possible combinations of properties and characteristics to be studied are considered, the time and the work involved becomes staggering.

It is, therefore, an object of this invention to provide new and improved information storage and retrieval systems.

It is another object of this invention to provide new and improved information and retrieval systems for the study of the simultaneous occurrances of more than one characteristic of a specimen.

It is a further object of this invention to provide new and improved information and retrieval systems in which the tabulation of information recorded therein is readily obtainable.

Other objects and advantages of this invention will become apparent as the following description proceeds, which description should be considered together with the accompanying drawings, in which.

Figure 1:
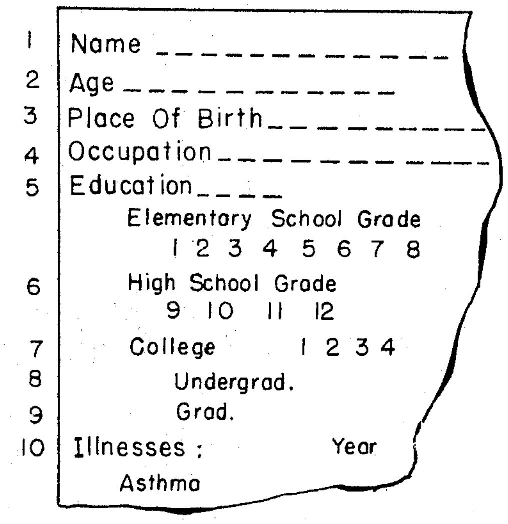
FIG. 1 illustrates a portion of a typical research questionaire.

Studies of all nature, whether they be scientific, social, economic, or any other form, require more than just the acquisition of information. Once information about a group of subjects, items, occurrences, or cases, is obtained, that information must be arranged in uniform groupings for study purposes. In addition, the interrelationships of the information gathered is often very important in some types of study. The processing of information gathered from a group of individual subjects requires a large amount of time, skilled effort, and patience. Very often a printed form of some nature, such as that illustrated partially in FIG. 1, is prepared to guide an interviewer or investigator in his gathering of information. Such forms are usually unique to individual subjects or cases and provide spaces for the recording of many facts about a single individual, subject or case. Obviously, when a study is launched about a single happening to a large number of individuals, the history or facts surrounding this particular happening must be gathered from each of the individual forms upon which the original information was recorded. If the number of studies for which such forms supply information is large, then it becomes a burdensome process to continually handle each of these unique case forms for each individual study. To overcome this objection very often the information recorded on the individual case form, such as that shown in FIG. 1, for example, the age, sex, occupation, or education; may be abstracted and recorded on individual tables which contain information only of a particular category. If a study requires the corelation of information in a group of categories, such information may often be combined onto a single document or tables, which when interpreted properly, indicates the correlation desired. It is not too difficult to reproduce the information from these tables into graphical form to show the occurrence, for example, of the number of cases of smallpox in a group of individuals between the ages of ten and fifteen years in Midwestern population centers having a population of less than 20,000 people. A group of such tables representing different periods of time, for example, could be combined to produce curves or charts which would indicate such relationships in different parts of the country or other geographic locations. These results and charts are extremely important in many studies, they sometimes point to a trend or bring out some not before realized connections. But the older methods of study have long been tedious and time consuming, and many more studies, if properly undertaken, may means more information reduced to utilizable form if more rapid means for comparing categories of information from a plurality of cases are made available. In preparing such information for utilization by a punch card machine or other modern information storage and reading system, the researcher is hampered by the fact that most of these machines are not designed for the particular purpose he has in mind, but are designed primarily for business processes and adapted, more or less, to research purposes.

Figure 2:
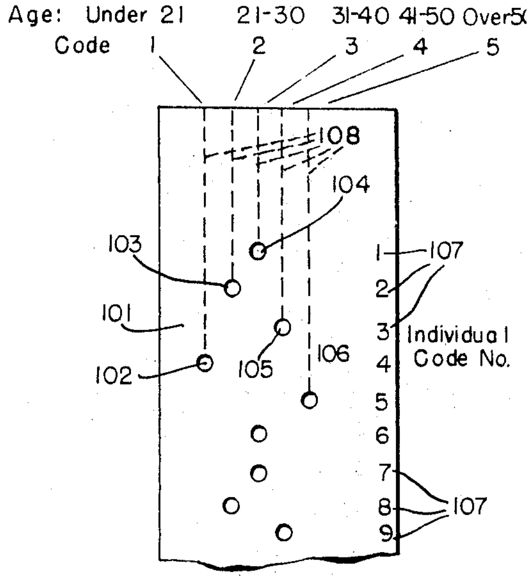
FIG. 2 shows a portion of a perforated tape containing age information.

If a recording medium is prepared for a particular category or group of categories with an assigned location for individual subjects or cases, the determination of either the number or the identification of cases falling within a particular category would be greatly facilitated. Consider, in this connection, the portion of punched tape, card, or other medium illustrated in FIG. 2. A readily perforable medium, 101, preferably in the form of an elongated sheet or tape, contains a plurality of perforations, 102, 103, 104, 105, and 106, arranged in prescribed tracks generally shown or indicated by dashed lines 108. Along one edge of the perforate member 101 an identification of case positions 107 may be imprinted or otherwise indicated. The particular portion of a record receiver illustrated in FIG. 2 may be considered to indicate or record the individuals falling into particular age groups, for example, the age groups indicated at the upper portion of the figure, such as under 21, 21–30, 31–40, 41–50, and over 50. Rather than utilize all these terms to indicate the particular age group identified, code numbers such as 1, 2, 3, 4, 5, may be used to represent the individual age groups. The record receiver 101 shown in FIG. 2 indicates that subject number 1 falls in the age group 31–40 years (or age group 3) and that subject number 2, represented by the perforation 103, is in age group 2. Thus, it is illustrated by FIG. 2 how information of a large number of individual subjects in a single category may be recorded upon a single record receiver member. This type of recordation enhances the ease with which particular categories can be studied either individually or in combination.

Figure 3:
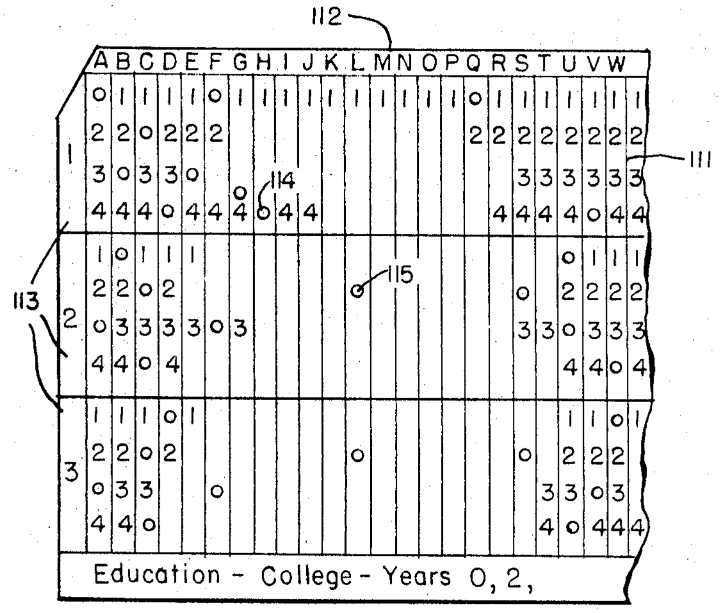
FIG. 3 shows a portion of a perforated card containing education information.

Another form of record receiver, upon which the information contained in the strip of FIG. 2 may be recorded is illustrated in FIG. 3 where the record receiver assumes the general form of the well-known punched card. In this type of arrangement the particular subject also occupies a unique position on the record receiver, but each subject position is indicated by a rectangular area in which a perforation may appear in any of four (in this example) positions. Of course, it must be realized that in FIG. 3 only a portion of single record receiver is illustrated and that a record receiver of this nature may comprise any reasonable size or shape such as, for example, a rectangular shape of the general sizes of either letter or legal size stationery, 8½ x 11 inches or 8½ x 13 inches or any other reasonable size. A sheet approximately 11 to 12 inches square is contemplated as a unit of sufficient capacity for research purposes. The record receiver comprises a readily perforated sheet 111 having column identification 112 along at least one edge and row identification 113 along another edge. The row identifications 113 may be repeated as shown in FIG. 3 or preferably, each group of rows 1 through 4 should bear a unique representation or identification character. Each group of four positions identified on the sheet 111 of FIG. 3 by the numbers 1, 2, 3, and 4 represents a cell or area dedicated to a particular subject or case. To identify a particular case the horizontal or row identification together with the vertical or column identification should be used in a manner similar to the well-known grid system. For this reason, two different forms of symbols are probably the best for identification purposes. In the example of FIG. 3 alphabetic characters are used to identify individual columns and numerical characters are used to identify individual bands or groups of rows. On the record receiver 111 of FIG. 3 only a few representative perforations are indicated, such as those shown at 114 and 115. It should be clear to those skilled in the art that each cell or group area, such as A–1, individual to a single case should contain a single perforation, in the position marked 1, 2, 3, or 4, in whichever position is proper for the particular case represented thereby. If, in the example of FIG. 3, it is again assumed that the information contained therein is age groups, each group being represented by the numeral 1, 2, 3, or 4, then each case or individaul is represented in one of the four age groups and cannot be represented in more than one. For this reason, only one perforation exists in a single cell. Of course, this discussion has used as examples individuals in age groups but it must be understood that any sort of information can be represented in record receivers of this nature. In some circumstances, more than one perforation may appear in an individual cell. The best example which comes to mind readily is the situation of an individual who has lived in a large number of geographical locations during his lifetime. A study which requires the environmental and geographical background of the individuals would necessarily require that a single individual be indicated by all of the geographical locations in which he resided for substantial lengths of time. In such circumstances, it should be understood that more than one perforation may be applied to a single cell which represents a single individual case or study.

Figures 4, 5, 6, 7:
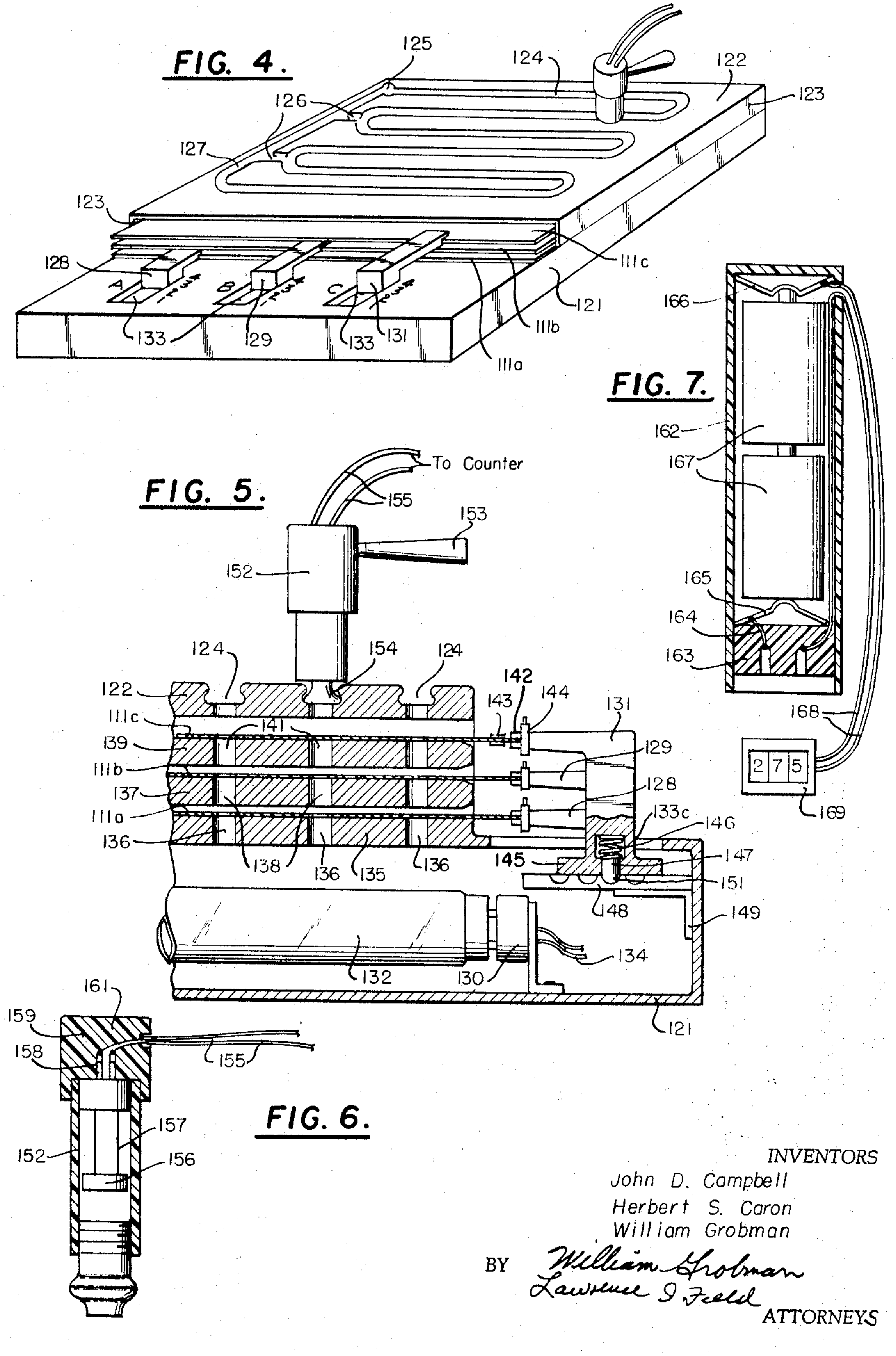
FIG. 4 is a perspective view of a manual information retrieval device according to this invention.
FIG. 5 is a sectional view through the device of FIG. 4.
FIG. 6 is a sectional view of the sensing means of FIGS. 4 and 5.
FIG. 7 is a battery adapter for the sensing means of FIG. 6.

The problem of reading this information together with information in other categories of the same individual has not yet been discussed. In many of the studies, in fact, in a majority of the studies undertaken in the sociological field as well as in economics, science, business and other types of endeavors, the occurrence of a plurality of simultaneous conditions is ofttimes important or desirable. The device diagrammatically illustrated in perspective in FIG. 4 is a simplified version of a manual machine for determining the coincidence of three different categories of facts about a large number of individual subjects. The device for reading information from a plurality of cards comprises a base 121 supporting a hollow cover having a top 122 and sides 123. A sinuous groove or guideway 124 is formed in any appropriate manner in the cover 122. The guideway 124 is primarily for the purpose of guiding a reading stylus over the individual rows of perforation positions found in the cards 111 of FIG. 3. The starting position 125 is designated by an enlarged opening generally circular in shape by means of which an enlarged lower portion of a stylus may be inserted into the groove 124. Since not all of the possible positions and locations on a card 111 may be utilized for any particular study, short circuit paths 126 are provided as a rapid means for skipping portions of the cards not desired to be read. A return home groove 127 is provided to return the stylus to its home or base position at the end of a read cycle. The housing is designed to contain, in the example shown in FIG. 4, three individual cards having reference characters, 111A, 111B, and 111C. Each card is removably attached to an individual support and guide arm 128, 129, and 131, respectively. Each arm is positioned in a slot 133 in the base 121 for movement therein.

In operation, the three cards 111A, 111B, and 111C are inserted into the housing 122 and connected to their respective arms 128, 129, and 131. Since each card as illustrated in FIG. 3 comprises in any one cell four different perforation positions, means are provided in the slots 133 for allowing movement of the individual arms and, consequently, the individual cards 111A, 111B, and 111C, to any of four discrete positions. When a reading operation is to take place, all of the cards are placed in the number 1 position and a stylus is inserted into the opening 125. A source of light contained within the base 121 is illuminated, and as a light-sensitive stylus traverses the sinuous path 124, a pulse output is recorded for each alignment of holes in the three cards 111A–C. Light will pass through all three of the cards only when there is an alignment of the perforation in all of the cards at that particular point. Thus, one traverse of the path 124 by a light-sensitive stylus produces the number of individual cases which fulfill all of the three categories being simultaneously studied. The sinuous path 124, is formed in the cover 122 so that with all of the cards in the first position the stylus will traverse the number one perforate position in all of the individual cells contained on the card. If any card is positioned other than in its number one position (assume for this example that card 111A is moved to the number two position) then, as the stylus is moved through the track 124 it will effectively read the number one perforation position of cards 111B and C and the number two perforation position of card 111A. Thus, it can be seen that the different combinations of information contained on the individual cards being simultaneously read may be easily obtained. In this manner the number of individual cases which will fall in the category of 1–1–1 in the cards A, B, and C can be counted by a first reading. By moving the card 111A to its number two position the number of individuals falling within the category 2–1–1 is now obtained. If a subsequent reading is made with the card 111A in its third position, then those subjects falling into category 3–1–1 would then be counted. In a similar manner, each of the cards may be individually moved to indicate, in any single pass of a stylus through the sinuous path 124, the number of individual subjects which would fall within the categories 1–2–1, 1–3–1, 1–2–2, 1–3–2, and so forth. By a simple construction such as shown in FIG. 4, an easily utilizable device is produced for counting the number of individual subjects which meet certain prescribed conditions. Of course, it must be understood that the number of cards illustrated in the device of FIG. 4 is for illustration purposes only and either fewer or more cards can be used. In addition, the number of categories, as well as the particular orientation of individual cases and categories, are for illustrative purposes only. If desired, the categories could be arranged horizontally rather than vertically as shown in FIG. 3. In addition, any reasonable number of categories may be utilized. If the direction of orientation of the individual categories is rotated through 90° it should also be understood that the track 124 must necessarily be rotated through 90° also so that the stylus guided by the track traverses all of the categories having a common designation. If desired (and this is considered a suitable precaution) the cards may have a unique configuration, such as the missing upper left-hand corner of the card of FIG. 3. A complementary structure may be inserted into the housing 122 to allow the insertion of the cards in only one position and to avoid possible inversion or rotation of the cards to prevent erroneous readings. The support arms 128, 129, 131 may be positioned in any of their four positions by suitable means, such as by ball and socket, spring biased detents, and so forth.

The individual devices and their details such as the track 124, the support members 128, 129, 131, and other details of structure as well as alternative embodiments are illustrated in FIGS. 5 through 12. FIG. 5 illustrates, in larger proportion and in section, a portion of the assembly of FIG. 4, showing in some detail the manner in which the cards 111A–C are supported within the housing. A light source, such as a fluorescent tube 132, is contained within the housing 121 and is supported in a socket 130 which is connected by wires 134 to any suitable source of electrical energy such as a source of 110 v. A.C. Above the base 121, and serving as the bottom portion of the card compartment, is a horizontal shelf or partition 135 having perforations 136 therethrough. The perforations 136 are located at each possible hole position in the cards. In this manner, light is permitted to pass from the source 132 through the holes 136 to penetrate any card perforation which may be present over the holes 136. The card 111A is supported upon the top of the shelf 135 and is gripped at one edge by the support member 128. Above the card 111A is a second shelf 137 having perforations 138 aligned with the perforations 136 in the shelf 135. The shelf 137 supports card 111B on its surface, and one edge of card 111B is gripped by the support member 129. A third shelf member 139, in the embodiment illustrated in FIG. 5, is located above the shelf 137 and has perforations 141 therethrough aligned with the perforations 138 and 136. The card 111C is supported upon the shelf 139 and has one edge gripped by the support member 131. The end of the support member 131 which grips the card is bifurcated to form a pair of jaws 142. An elongated stiffening member 143 is attached to the card in a manner to be explained in greater detail hereinafter and is inserted in the bifurcated jaws 142. The jaws 142 are clamped about the retaining member 143 by a ring 144 also shown in greater detail hereinafter. In a similar manner the support members 128, 129 support cards 111A and 111B respectively. The support members are mounted in grooves 133A, B, and C formed in the top portion of the base 121. The bottom part of support member 131, shown in FIG. 5, is enlarged to form a base 145 which retains the support member within the groove 133C. A small shelf 148 is mounted on the inside of the base 121 by means of an angle bracket or any other suitable means to carry the support members 131, 129 and 128. The bottom portion of the support member 131 has a bore 146 which contains a spring member 147. The top of the shelf is formed with detents 151 into which the spring member 147 fits. In this manner, the support member 131, or members 128 or 129, may be moved to any of a plurality of positions and frictionally retained therein. An optical sensor 152 is diagrammatically illustrated in FIG. 5 having a handle 153 and an enlarged lower portion 154 for insertion into the track 124. The sensor is connected to the counter relay and appropriate power supply (not shown) by means of wires 155.

In operation, the bottom portion 154 of the optical sensor 152 is inserted into the enlarged opening 125 in the track 124. The light source 132 is illuminated and the cards 111A, B and C are positioned within the cover 122. The optical sensor 152 is then moved by means of the handle 153 from one end 125 of the track 124 throughout its route to the return path 127 and back to the starting point 125. As the sensor 152 passes over any perforation position in which perforations in the three cards 111A, 111B and 111C are aligned, a beam of light impinges upon a photosensitive element contained therein and generates a pulse of electrical energy. This pulse is transmitted through wires 155 to a counter means. In this manner all of the points at which the perforations in the three cards coincide are counted and registered on the counter. After a traverse of the track 124 is made with the cards in a first position, assuming the position 4–4–4 as shown in FIG. 4, one of the cards is then moved to a second position, for example card 111A is moved to position three. The count recorded on the counter for the first reading is noted either by imprinting from the counter or by manual means, and the counter is cleared to zero. The sensor 152 is then again moved along track 124 from the starting point 125 to the return path 127, and again all of the points at which the perforations in the three cards coincide are recorded on the counter. Again the reading is taken from the counter and the counter is cleared to zero. Then one of the cards is again moved to another position. Card 111A could be moved to position 2 or it could be left where it was and card 111B or card 111C moved to position three. When each reading is recorded for each possible position of each individual card, the cards are individually moved to another position until all possible combinations have been covered. In this manner, the coincidence of perforations, viewing again for this point FIG. 3, in all of the 1–1–1 positions, then the 1–1–2 position, then the 1–1–3 position, and so forth, are individually recorded.

One form which the manual optical sensor may assume is illustrated in section in FIG. 6. The sensor 152 comprises a housing of any suitable insulating material such as a synthetic resin. The bottom portion, including the enlarged base portion 154, is formed of a light conductive material such as an acrylic resin, known for example by the names of Lucite or Plexiglas. A photosensitive transistor 156, supported by leads 157, is mounted within the housing. The wire 157 also electrically connects the transistor 156 to a male plug member 158 adapted to mate with a female plug member 159 which is contained in a cap 161 of insulating material similar to that of the housing, and which is connected by the wires 155 to external circuitry. For portable operation, the adapter member illustrated in FIG. 7 may also be used. The adaptor for portable use comprises a housing 162 of suitable insulating structural material having a female plug member 159 of FIG. 6. The plug member 163 is connected by wires 164 to at least one of a pair of spring contact members 165 and 166. A pair of dry cells 167 or other similar sources of direct electrical energy are mounted within the housing 162 contacting the spring contacts 165 and 166. A pair of wires 168 serves to connect the circuit within the housing 162 to a counter 169.

In operation, the cap member 161 is removed from the sensor 152 of FIG. 6 and is replaced with the adaptor member shown in FIG. 7 with the female socket 163 mating with the male plug 158 of the sensor 152. The transistor 156 is then energized from the dry cells 167 contained within the housing 162 which are also connected in series with the counter 169. Whenever light is allowed to impinge upon the transistor 156, it operates as a closed switch and allows current to flow from the dry cells 167, through the transistor 156, to the counter 169, registering a count. This adaptor may be used wherever feasible for operations in the field or in any location where sources of electrical energy are not readily available or where trailing wires would create a nuisance or a hazard.

Figure 8:
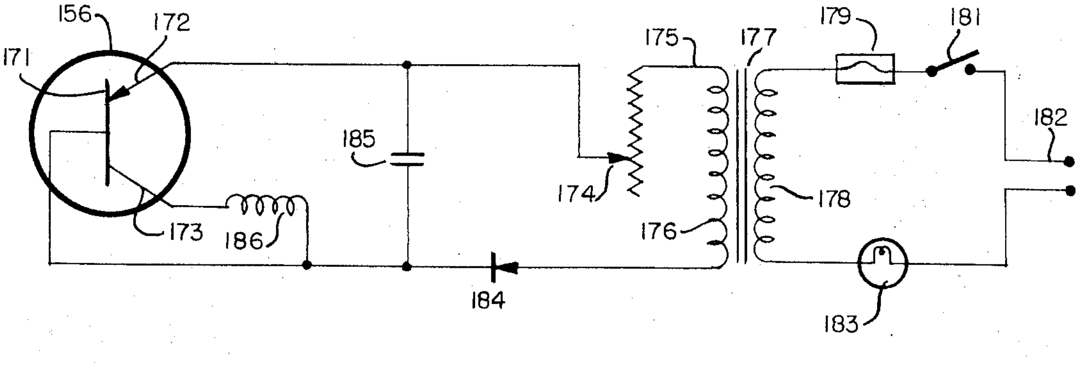
FIG. 8 is a schematic diagram for the circuit of the sensing means of FIG. 6.

The circuit is illustrated in FIG. 8 for the device of FIG. 6. A transistor 156 comprises an emitter electrode 172, a base electrode 171 and a collector electrode 173. The emitter electrode 172 is connected to the sliding contact 174 of a potentiometer 175. One end of the potentiometer 175 is connected to a secondary 176 of a transformer 177 whose primary 178 is connected through a fuse 179, a manual switch 181, and plug 182, to a source of electrical energy such as a source of 110 volts of alternating current. A pilot light 183 is connected in series with a primary to indicate when it is energized. The secondary 176 is also connected to one side of a rectifier 184, the other side of which is connected to one side of a capacitor 185, the other side of which is connected to the slide member 174 of the potentiometer 175. A counter-solenoid 186 is connected to the junction between the capacitor 185 and the rectifier, as is the base electrode 171.

In operation, the plug 182 is inserted into any suitable electrical receptacle to energize the circuit. When the switch 181 is closed, the primary 178 of the transformer 177 is energized. Low voltage electrical energy is induced in the secondary 176 and flows through the half wave rectifier 184 to the capacitor 185 to charge it. When light impinges upon the transistor 156, its impedance is lowered appreciably, and the capacitor 185 discharges through the collector-emitter electrode circuit, allowing a pulse of electrical energy to pass through the counter solenoid 186 and operate the counter by one count. During the periods between irradiation of the transistor 156, the current flowing through the rectifier 184 recharges the capacitor 185. The potentiometer slide member 174 is used to regulate the current flow and the voltage supplied to the components within the circuit.

Figure 9:
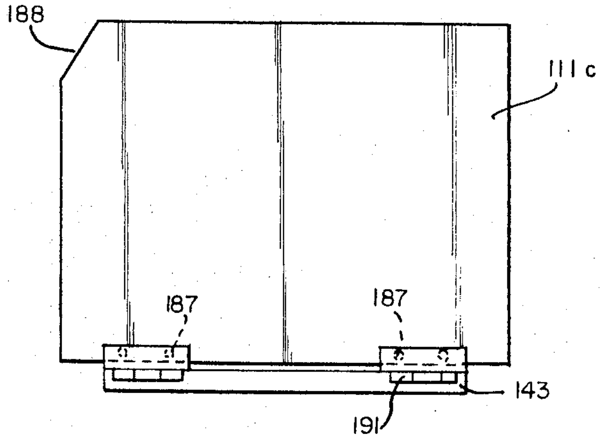
FIG. 9 is a plan view of a record receiver and its holder for the device of FIG. 4.
Figure 10:
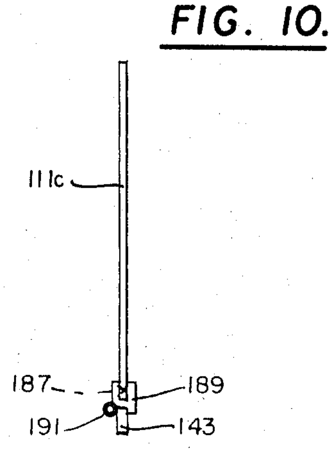
FIG. 10 is an end view of the card and holder of FIG. 9.

The card 111C is illustrated in FIGS. 9 and 10 also, showing the manner in which it is supported and gripped by the jaws of the support member 131. The card 111C has one corner 188 removed so that it may be properly positioned within the housing 122. A mating diagonally positioned member is located within the cover 122 so that the card 111C may be inserted in one position only, thus avoiding either turning or inverting the cards. A rigid, elongated stiffening member 143 is connected to the card 111C by means of jaws 187 and 189. The jaws 187 are connected to the stiffening member 143 by means of hinges 191, and the jaw 189 is rigidly and fixedly connected to the stiffening member 143.

In operation, the jaw 187 is folded back on the hinges 191, and a card, such as 111C, is inserted between the two jaws 187 and 189. The jaws 187 are then closed, gripping the card 111C firmly therewithin. The stiffening member 143 provides a means for transmitting the force from the support member such as 131, along the entire width of the card as the card is moved from one position to another, thus reducing the possibility of buckling and of rotating about the axis of the support member itself. Since the support members must be disposed transversely on one edge of the base 121, the cards cannot all be gripped in the center, and some device, such as the stiffening member 143, is desirable to ensure equal distribution of the forces along the entire width of the card. If desired, instead of the use of a stiffening member 143 the card itself may be provided with an additional thickness, such as by folding, or with a stiffening coating, such as a synthetic resin, laminated metals, and the like. In fact, other forms of stiffening for the edges of the card 111C will be quite obvious to those in the art.

Figure 11:
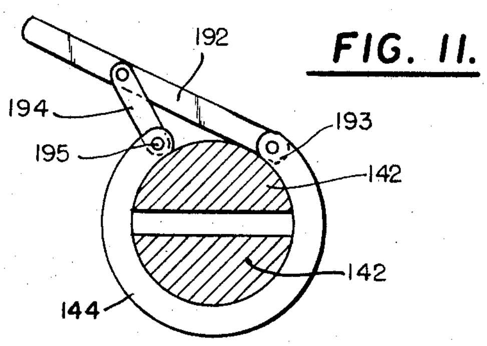
FIGS. 11 and 12 are end and side views, respectively, of the card holder support means of the device of FIG. 4.
Figure 12:
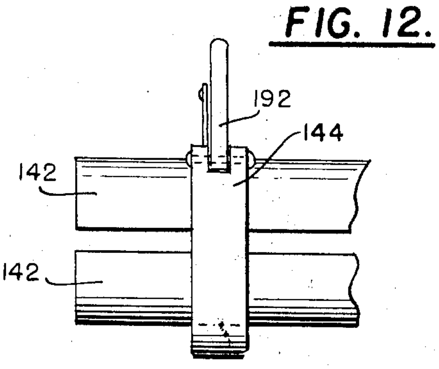

In FIGS. 11 and 12, some details of the jaw members 142 and the retaining ring 144 are shown. The retaining ring 144 is a split ring having an elongated lever 192 fastened to one end 193 and a toggle 194 fastened to the other end 195. When the ring 144 is opened, the lever 192 is moved upwardly and swings about the toggle 194 as a fulcrum, forcing the two ends 193 and 195 apart. After the stiffening member 143 or the edge of the card is inserted in the jaws 142, the lever 192 is moved downwardly, rotating about the toggle member 194 and drawing together the two ends 193 and 195, forcing the two jaw members to contract and firmly grip the object placed therebetween. If desired, notches may be cut in the ends of the retaining ring 144, and the lever 192 and the toggle 194 inserted therein by means of suitable pivots.

Figure 13:
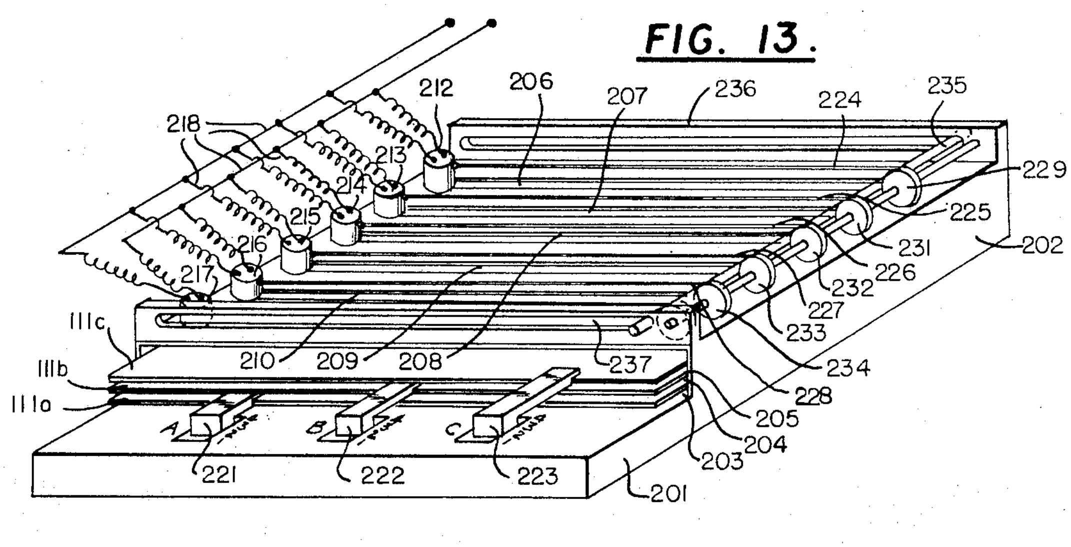
FIG. 13 is a perspective view of a semiautomatic information retrieval device according to this invention.
Figure 14:
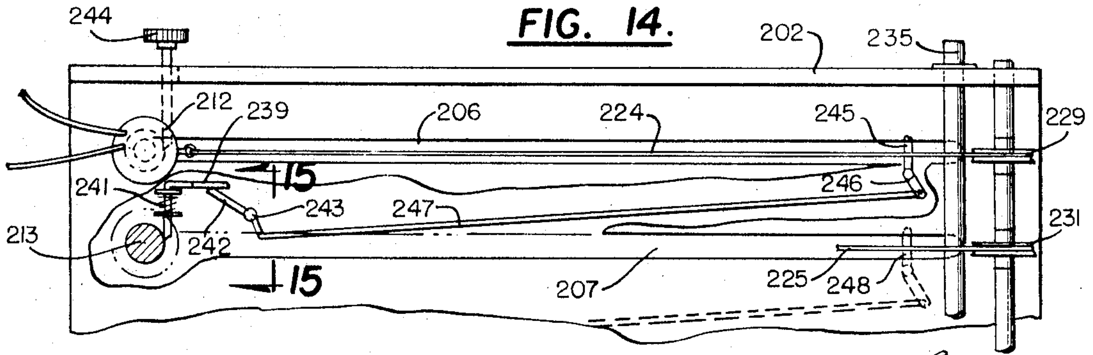
FIG. 14 is an enlarged plan view of a portion of the device of FIG. 13 showing the trip members.

In addition to the manual apparatus illustrated heretofore, particularly in FIG. 4, semi-automatic and automatic equipment for determining the coincidence of information on cards 111A, 111B, and 111C are also feasible. One possibility for a semi-automatic device is illustrated schematically in FIGS. 13, 14, and 15. The apparatus comprises a base 201 having a generally open upper portion 202 in which 3 horizontal spaced shelves 203, 204, and 205 individually support the perforated cards 111A, 111B, and 111C. As described heretofore in connection with the device of FIG. 4 and FIG. 5, the card 111A is supported at one end by a support member 221, the card 111B is held by a support member 222, and the card 111C is held by a support member 223, each of these support members being similar to their respective counterparts illustrated and described in connection with FIG. 4. The upper portion 202, instead of having a single sinuous track, such as the device of FIG. 4, has a plurality of parallel tracks 206, 207, 208, 209, and 211 which are separated by a distance equal to the spacing of the individual rows of horizontal cells on the card shown in FIG. 3. Thus, the tracks 206 and 207 of the device of FIGS. 13 and 14 are spaced from each other by a distance equal to the distance occupied by a row of cells such as the row 1 or the row 2 of the card of FIG. 3. A plurality of movable scanning elements 212, 213, 214, 215, 216, and 217 are mounted individually in separate tracks 207–211. The scanning members 212–217 are electrically connected, by means of wires generally designated 218, in parallel and to the power supply and counter circuits in a manner similar to the scanning elements of FIGS. 4–8. Each of the sensing members 212 through 217 has connected to it, by any suitable means, a cable 224, 225, 226, 227, and 228 which are individually passed over pulleys 229, 231, 232, 233 and 234. The cables or pulleys are spring biased to pull the individual sensing elements 212–217 from their start positions, along the tracks individual to the sensing elements, to a rest position. A return lever 235 is supported at each end in slotted guide members 236 and 237 and is used for returning the sensing elements 212 to 217 to their initial position.

Figures 15, 16:
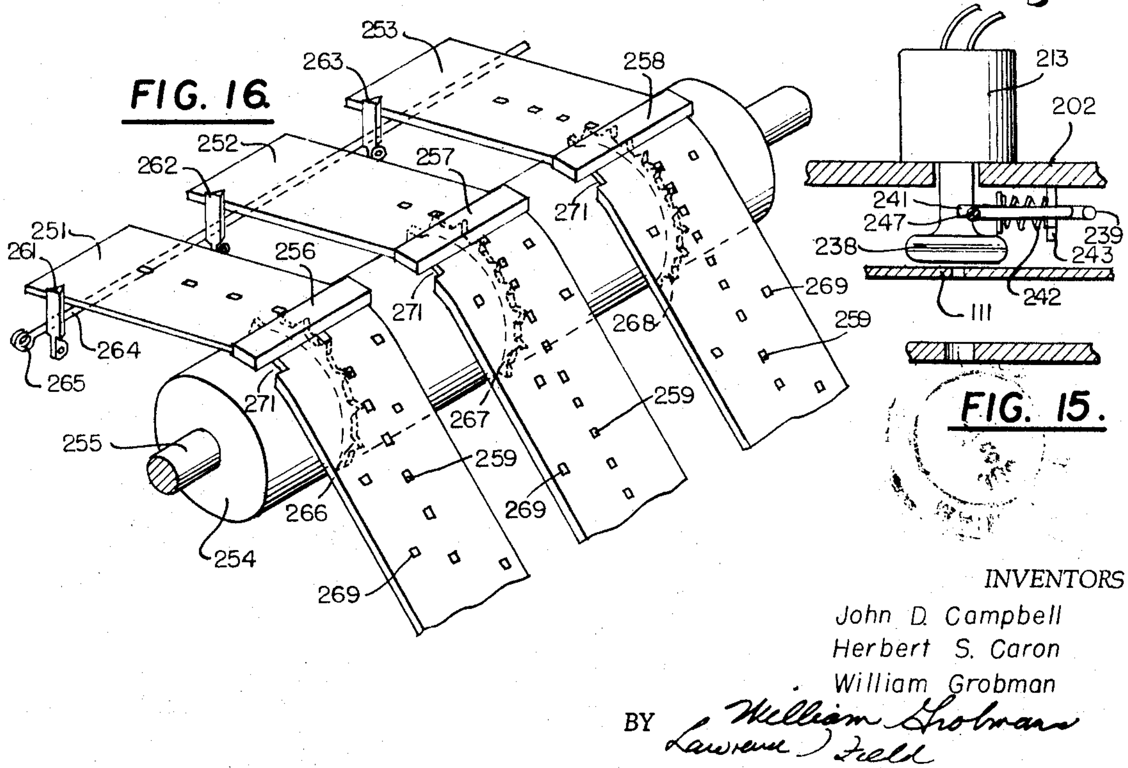
FIG. 15 is a side view, partially in section, of a portion of the device of FIG. 13.
FIG. 16 is a perspective view of a simplified tape reader according to this invention.

In the initial or starting position, each of the sensing members 212–217 is held by a releasable latch, such as those better illustrated in FIGS. 14 and 15. FIG. 14 illustrates in some detail a latch member 239 which is spring biased by a spring member 241 into locking engagement with the enlarged lower portion 238 of the sensing member 213. The latch member 239 can be moved against the action of the spring 241 by a lever 242 which is mounted pivotally on a pin 243. In FIG. 14 a complete arrangement of latch members for a sensing element is illustrated. The first scanning member 212 is held in position by a manually movable latch member 244 which extends through the side of the base or top part 202.

The elements, the details of construction of the individual scanning members, the manner in which they are energized, and the details of structure of the top portion 202 together with the shelves 203, 204 and 205 and the support members 221, 222, and 223, have been shown in FIGS. 4–12 and will not again be described herein.

In the operation of the semi-automatic device as illustrated in FIGS. 13, 14, and 15, the three perforated cards 111A, 111B, and 111C are inserted into the upper portion 202 so that each rests upon its own respective perforated shelf 203, 204, and 205 in the same manner as the cards were inserted into the upper portion 123 of the device of FIG. 4. Each of the support members 221, 222, and 223 is manually movable into any of four different positions. The extent of movement from one position to the next is equal to the space occupied by a single row of perforations in the card shown in FIG. 3, whereby the movement of any card from one ponsition to the next adjacent position causes a different horizontal row of perforations to be moved into operative scanning position. In this respect, the devices of FIG. 4 and FIG. 13 are similar. However, where the scanning of the cards in the device of FIG. 4 was accomplished by a single scanning member moved manually throughout the sinuous trace 124 to scan the entire card, the scanning operation is only initiated manually in the device of FIG. 13 and is thereafter carried out automatically. When the cards 111A, B, and C have been properly positioned for the first scan, the manual latch member 244 is manually moved against the action of a spring (not shown) to release the scanning member 212. The scanning member 212 is pulled across the track 206 by its cable 224 to scan one complete row of perforations. As it moves through the track 206, the scanning member 212 generates a pulse each time it encounters light passing through the aligned perforations in cards 111A, B, and C, and the pulse output from the scanning member 212 is recorded on a counter, not shown, in a manner described above. When the scanning member 212 has completed its scan, it strikes the lever 245 (FIG. 14) to rotate it about its pivot 246, causing the movement of the lever 247 and rotation of the member 242 about its pivot 243. This retracts the latch member 239 against the action of the spring 241 and releases the next scanning head 213 which, in turn, is pulled across its track 207 by its cable 225 and scans a second row of perforations. This operation is continued until all of the scanning heads have completed their scan and the total number of aligned perforations has been counted. The return lever 235 is then manually moved to the left, as shown in FIG. 13, to restore all of the scanning heads 212–217 to their start position. As the heads are moved into their start position they encounter the tapered portions of their respective latch members, such as 239, and force the latch members aside to allow them to move behind. The latch members are biased back into latching position by suitable resilient means to hold the scanning heads until they are again released. The spacing between the adjacent tracks is equal to the height of a single horizontal cell or a group of rows as shown on the card of FIG. 3. Thus, each scanning head scans the equivalent row in its own respective cell portion. After each scanning operation has been completed, the arrangement of the cards may be changed in a manner similar to that described in connection with the operation of the device of FIG. 4. Assuming that all of the cards 111A, B, and C were arranged in the position shown in FIG. 13, the number 4 row of each horizontal group of rows of cells of each of the three cards would have been scanned. After this scanning, one of the cards, say for example, card 111A, may be moved to another position, such as position three, and the next scanning operation would then record the alignment of the holes or perforations in rows 3–4–4 of cards 111A, 111B, and 111C. In this manner each of the combinations and permutations of categories of information recorded on the individual cards may be compared for coincidence, and the results readily tabulated by semi-automatic equipment.

The device illustrated in FIG. 13 and described above, is essentially a semi-automatic device in which the scanning operation is automatic but in which most of the other operations are manually performed. Without departing from the spirit of the invention, many modifications of this equipment could be made and one of those which comes to mind is the motorization or mechanization of the resetting of the scanning heads. When the last head, 217 as shown in FIG. 13, has performed its scanning operation, it could operate a switch which would start an electric motor to drive the reset lever 235 and restore all of the heads to their initial positions. Carrying this line of thought a bit further, automatically operable indexing means could be provided to move the support members 221, 222, and 223 in any prescribed sequence. The restoration of the scanning heads 212–217 to their initial positions could automatically operate the card indexing means to its next position. In such a device, the restoration of the heads to their start positions would preferably also operate the counter to print out totals and reset to zero in preparation for the next scan. Such mechanization would provide for an essentially automatic scanning operation in which the operator would be required only to set up the equipment by selecting the proper information cards and arranging them in their start positions at the beginning of each tabulation. Other modifications could comprise electrically tripped latches and electrically driven scanning members rather than spring driven devices.

It should be realized from the preceding description that each complete individual scan of the cards in any one arrangement results in information for a single cell of a table. What this means is that in determining how many individuals within a certain age group live in a prescribed city, for example, the arrangement of the cards is such that the particular areas defined for the desired age and the prescribed city are aligned, and the scanning operation counts the number of aligned perforations therethrough. Thus, at the end of a scan the number of coincidences of perforations which have been counted will indicate the number of people within the desired age group who reside in a prescribed city. When the position of either card is changed, either a new age group is bought into scanning position or a new city is so positioned, and the next scan produces the total number of individuals of the next age group living in the same city or the total number of individuals of the first age group which live in the next city. In this manner, a table showing the distribution of individuals in different age groups and in different cities is produced. While the preceding described apparatus serves to produce such a table fairly rapidly, it would be far more advantageous if, during a single scan, an entire column or row of tabular information could be produced. Using the above example, this would mean that a single scan could be able to produce the number of individuals of all age groups being considered residing in an individual city or the number of individuals of a single age group which reside in all of the cities being considered. From this, it can be seen that a device which will produce information for a plurality of cells in such a table would be far more rapid in usage than the preceding described apparatus.

Actually, such a table can be produced by modification of the equipment illustrated in FIG. 13. To produce a complete column or row of tabular information at one sweep rather than an individual cell would mean that all of the categories of one dimension must be individually examined in the light of a single category of each of the other dimensions being considered. This raises the question of properly coordinating the different combinations of categories of the various dimensions to produce useful information.

If the card of FIG. 3 is observed, it becomes evident that a device of the order of the device of FIG. 13 can be constructed to provide an individual scanning head for each of the four categories of the particular dimension of one of the cards of FIG. 3. At the same time an individual head must be provided for a single category of each of the other cards being scanned. The remaining problem is primarily one of coordination to assure that the results of each scan of subjects in each of the categories of the first card are properly combined with the corresponding occurrences of the same subject in the individual categories being scanned on the other card. However, this raises another problem with the device of FIG. 3, for each category appears a number of times on a card. It would then be virtually impossible to scan all of the subject positions in any category in the card of FIG. 3 without avoiding confusion. The logical solution to that problem would be the sequential scanning of the categories which are arranged in multiple rows, row-by-row with the second row of subjects in any category not being scanned until the first row has been completed. From this it can be seen that the equipment becomes complex, for to accomplish the purpose of acquiring information from a complete row or column of the table, it becomes necessary to first provide suitably accurate and infallible means for combining the categories being scanned among these various cards, and also to provide sequential operation equipment so that a complete row of subjects can first be scanned for all of the possible category combinations before the next row of subjects on the same group of cards is so scanned. In addition to complicating the apparatus required, this also additionally burdens the operator, who must at all times maintain a running account of the combinations of categories being scanned and of which combinations of categories he has already obtained results. It is doubtful that automatic or semi-automatic equipment such as that described and illustrated in FIG. 13 can be reliably operated to produce, in a single operation, a row or column of tabular information rather than a single cell of such information.

However, the apparatus of FIGS. 16–22 will produce such tabular information. Considering first FIG. 16, the reference characters 251, 252, and 253 designate individual perforated tapes which pass over a sprocketed roller or drum 254 mounted for rotation upon a rotatable shaft 255 which may be suitably supported in any well-known manner. On the other side of the tapes from the roller 254 are banks of reading heads 256, 257 and 258 for reading or determining the position of individual perforations in the tapes as the tapes are moved between the roller 254 and the banks of heads 256–258. To align the tapes 251–253 for initial operation, a group of individual wedge shaped alignment pins 261, 262, and 263 are provided to fit into appropriately shaped notches in a leading edge of each tape. Each of the wedge shaped alignment pins 261–263 is pivotally mounted and is connected to a rod 264 which has a ring member 265 at one end. When the tapes have been aligned and operation is about to begin, the alignment pins 261–263 are readily removed from operative engagement with the tapes merely by pulling the ring 265 and moving the rod 264. Individual sprocket gears 266, 267, and 268, each rigidly mounted on the drum 254, are provided to ensure synchronous drive of the individual tapes 251–253. Starting and stopping sensing notches 271 are provided in one edge of each tape at a position such that when the tapes are aligned for the initiation of an operation, the starting or stopping notches 271 are sensed.

The operation of the apparatus of FIG. 16 is relatively simple. The groups of heads 256–258 are hinged at one edge, or are otherwise removable from the tapes 251–253 to allow the tapes to be interposed between the banks of heads and the drum 254. The individual tapes 251–253 (although it should be clearly understood that any number of tapes can be used for this device, three tapes having been selected as a suitable number for explanation purposes only) have been inserted between the groups of heads 256–258 and the drum 254, and are positioned so that one of their sprocket holes 259 engages a tooth of the appropriate sprocket gear to 266–268 and that the alignment notches are in position to receive the alignment pin 261–263. Th banks of heads 256–258 are then replaced into position over the tapes 251–253 and rotation of the drum 254 is initiated. As the drum rotates, the tapes are simultaneously and synchronously moved under the sensing heads 256–258, and the presence of perforations 269 in each tape is sensed.

Now that the operation of the apparatus of FIG. 16 is clear, the construction and purpose of the individual tapes should be explained. The tapes 251–253 can be considered to be the same as that illustrated and described in connection with FIG. 2. Each tape 251–253 represents an individual dimension having individual categories arranged longitudinally but spaced transversely, Individual subject positions are assigned longitudinally spaced locations on the tapes, and information is recorded thereon by perforating the proper category in the position assigned to the proper individual subject. Thus, using the example of FIG. 2, if the tape 251 represents the dimension of age, each category can represent an age group such as that shown in FIG. 2. When a subject is found to belong within one of the age groups represented, a perforation in that subject's assigned position is made in the appropriate category which represents the age group. In a similar manner, the tapes 252 and 253 may contain information of other dimensions. As the tapes are moved by the roller or drum 254 under the sensing heads 256–258, the occurrences of the individual perforations are sensed and indicated in such a manner that the coincidence of perforations in assigned categories of the different tapes is readily available for tabulation.

Figures 17, 18:
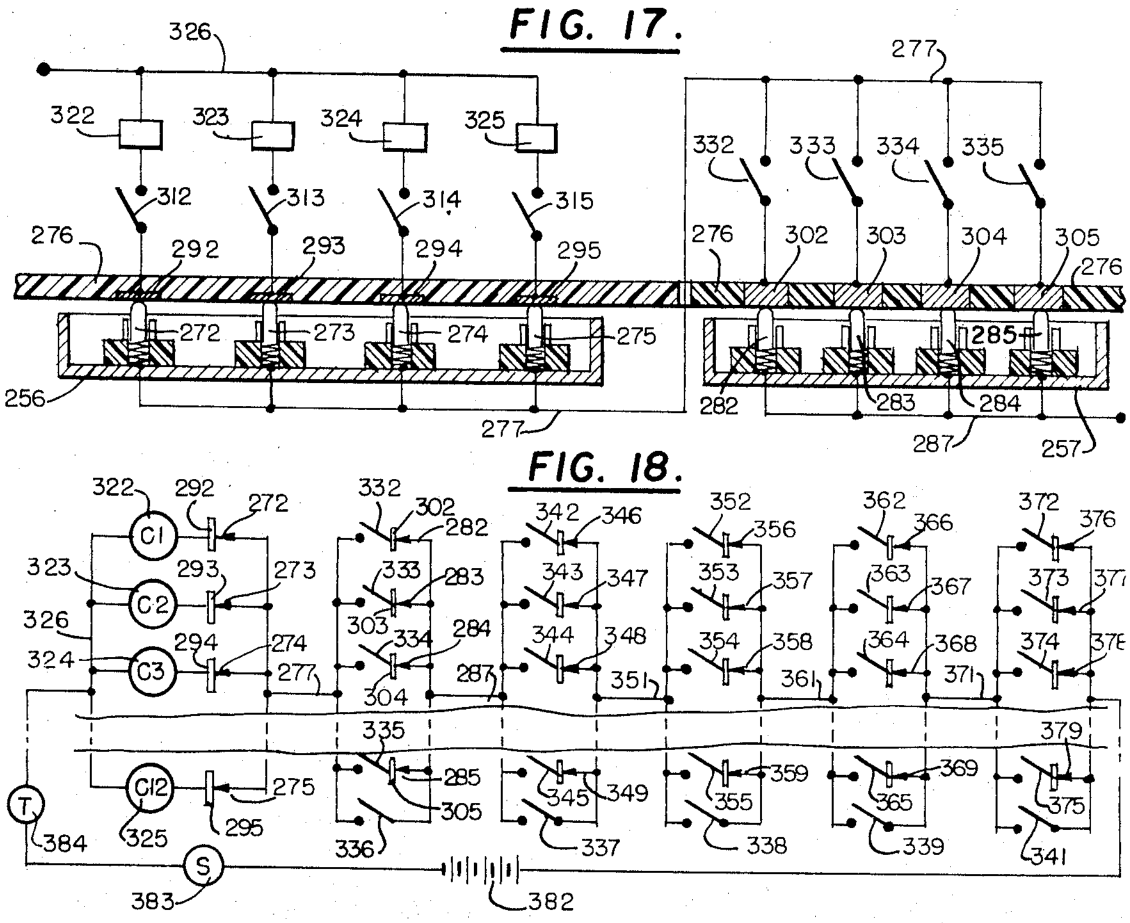
FIG. 17 is a schematic showing of a typical reading circuit for a tape reader according to this invention.
FIG. 18 is a schematic diagram of a circuit for the sensing means for a tape reader according to this invention.
Figure 17A:
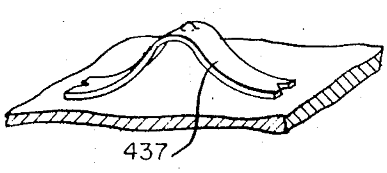
FIG. 17A is a perspective view of a sensing pin.

The details of structure of the groups of heads 256–258 are better illustrated in FIG. 17 in which groups 256 and 257 are illustrated schematically. Group 256 comprises four pins, 272, 273, 274 and 275, each spring biased toward a platen 276. The individual pins 272–275 are supported in insulating cups to prevent short circuiting, although they are actuably connected to a common lead 277. The platen 276 is formed of electrically insulating material and has imbedded in its surface opposite the pins 272–275, strips of conductive material 292, 293, 294 and 295. In a similar manner, the group 257 comprises conductive pins 282, 283, 284 and 285, individually mounted in insulating cups and spring biased toward the platen 276. However, to illustrate another form in which the plate may be made, conductive portions 302, 303, 304 and 305, opposite the pins 282–285, are formed as laminations with the insulating material rather than being imbedded in the surface of the platen 276 as were the strips 292–295. The pins 282–285 are connected together to a common line 287. Each of the conductive strips 292–295 is connected individually through a respective switch 312, 313, 314 and 315. The other side of the switches 312–315 are individually connected to one side of electrically operated counters 322, 323, 324 and 325 which have their other sides connected together and to a common line 326. In a similar manner, each of the conductive portions 302–305 of the platen 276 are connected to individual manually operated switches 332, 333, 334 and 335 which have their other sides connected together and to the line 277. The lines 326 and 287 are connected to opposite sides of a source of electrical energy. Instead of pins 272–275 and 282–285 and their associated springs, unitary sensing elements such as that illustrated in FIG. 17A may be used. This sensor comprises a bow of resilient conductive material such as brass or bronze and a tip formed to enter the perforations in the tape.

In operation, the perforated tapes are interposed between the banks of pins 272–275 and 282–285 and the platen 276. Those individual switches 312–315 and 332–335, which designate the particular categories to be scanned in the individual operation, are closed. For this example, we will assume switch 312 and switch 332 are both closed. Then, as the perforated tapes are moved between the pins and the platen, the spring biased pins will pass through any perforation which occurs in the tapes and make electrical contact with the corresponding conductive element opposite it on the platen 276. When a perforation appears simultaneously opposite the pin 272 and also opposite the pin 282, a circuit is completed from the line 326, through the counter 322, the switch 312, the conductive element 292, pin 272, line 277, switch 332, conductive element 302, pin 282, through the line 287 and back to the source. The counter 322 is then tripped once and registers a single count for each such coincidence of perforations which make their presence felt opposite the pins 272 and 282. Since the other switches are not closed, no other counters are energized.

To simultaneously produce a column of tabular information rather than a single cell, all of the switches 312–315 would be simultaneously closed, and the combination of each category designated here as 1, 2, 3, and 4 of the tape being sensed by the sensing pins 272–275 with any single category of the tape sensed by pins 282–285 could be produced. For example, assume that the switches 312–315 were closed and that switch 332 was also closed, then each time that a perforation appeared beneath the pin 282 at the same time that a perforation appeared beneath any of the pins 272–275, a count would be registered in the appropriate counter 322–325. Each count then represents the number of coincidences which occur between a single category of each of the two dimensions being studied, and all of the counts, collectively as registered by the four counters 322–325, represent a column of information. Of course, if the equipment is to be used in this manner, that is to derive a complete column of information rather than a cell, the switches 312–315 may be omitted and the circuits from the plates 292–295 through the counters 322–325 could be completed by an unbroken lead.

The sample complete circuit for a group of six banks of sensing heads, each adapted to sense an individual tape is illustrated in FIG. 18 to better show the operation of the equipment. In order to point up the correspondence between the elements shown in FIGS. 16 and 17 and the diagrammatic showing of FIG. 18, the same reference characters are used to indicate the corresponding counters, switches, sensing pins and so forth among the various drawings. Therefore, as explained above, four counters 322–325 are shown connected in a first bank in FIG. 18. One side of counter 322 is connected to the plate 292 which makes contact with the sensing pin 272 when a perforation is sensed. In a similar manner, one side of each of the counters 323, 324 and 325 is also connected to plates 293, 294, and 295, which plates make contact with sensing brushes 273, 274 and 275. The other sides of the counters 322–325 are connected together and to a line 326, and all of the sensing brushes 272–275 are connected together and to a common line 277. The second bank illustrates the individual switches 332–335 which have one side connected to the common line 277 and their other sides individually connected to the plates 302–

305 which make contact with sensing brushes 282–285. This has been illustrated in FIG. 17. In addition to those two banks, three additional banks are illustrated, the third bank comprising individual switches 342, 343, 344 and 345 and sensing brushes 346, 347, 348 and 349. One side of each of the switches 342–345 is connected together and to a common lead 287 which is connected to the junction of the brushes 282–285 of the second bank. The other sides of the individual switches go to the contact plates, not numbered, and the sensing brushes 346–349 are also connected together and to a common lead 351 which, in turn, is connected to the junction of another group of individual switches 352, 353, 354 and 355. The other side of each of the switches 352–355 is connected to a contact plate, not numbered, each of which contacts individual sensing brushes 356, 357, 358 and 359, which are connected together and to a common line 361. The line 361 is connected to the junction of one side of each of the switches 362, 363, 364 and 365 of a fifth bank of switches and sensing heads. The other side of each of the switches goes to contact plates, not numbered, which contact individual brushes 366, 367, 368 and 369, all of which are connected together and to a common line 371, which is connected to the junction of one side of individual switches 372, 373, 374 and 375 of a sixth bank. The other sides of the individual switches 372–375 are connected to individual contact plates, not numbered, which make contact with individual sensing brushes 376, 377, 378 and 379. The brushes 376–379 are connected together and through a common lead 381 to one side of a source of electrical energy such as a battery 382. The other side of the battery 382 is connected to one side of a subtotal counter 383 which is in series with a total counter 384, the other side of which is connected to the common lead 326.

Actually, the circuitry just described can probably be summarized by considering it as a group of banks of parallel operated switches, which banks are connected in series with each other and in series with a plurality of counters and a source of electrical energy. Consider, for example, what happens when one switch of each bank is closed. For this purpose consider the sensing brushes and the contact plates as forming a switch and the individual switch as a selecting means, for that is really their function. If the sensing brush 282 in bank two, in bank three the brush 347, in the bank four the brush 358, in bank five the brush 369 and in bank six the brush 376, are to be selected, then the corresponding selection means 332, 343, 354, 365 and 372 must be closed to make the appropriate selection. Non-conducting tapes are interposed between the sensing brushes and their contact plates in each bank of sensing heads. However, these insulating tapes are perforated at preselected positions. As the tapes are moved longitudinally between the brushes and their respective plates, a perforation is sensed by penetration thereof by the brush and contact with its appropriate contact plate. In perforations simultaneously appear under any one of the brushes 272–275 and under brush 302, brush 347, brush 358, brush 369, and brush 376, then a complete circuit has been established through the sensing heads, allowing current to flow from the source of energy 382 through the appropriate counter, 322, 323, 324, or 325, and through the total and subcounters 384 and 383 respectively. Unless that particular combination of perforations appears at any one time, no pulse of energy will flow through the circuit, for at one point or another the insulating tapes will be interposed between the brushes and their corresponding contact plates to interrupt the circuit. From this it can be seen that the circuitry illustrated comprises an automatic means for determining the coincidence of information which has been selected for study. By closing the appropriate switches 332–335, 342–345, 352–355, etc., the individual categories in the various dimensions are selected, and by this means various combinations of categories can be counted.

Since, as a preface to a discussion of this type of apparatus, it was assumed that an entire column of tabular information was desired, no selector have been interposed in the first bank of sensing heads. In their places, the individual counters are inserted in series with individual lines. Although all of the brushes of the first bank are continually being used, only a single brush of any of the other or subsequent banks is ordinarily used at any time, and, therefore, it is quite feasible to connect all of the brushes of any group together and all of the sensing plates of any group together (through their appropriate selecting means, of course). Since the circuit is established through only one sensing head at any time in any bank, it is unnecessary to run individual lines from each head of a bank to the individual heads of the other banks. In addition to the sensing of individual categories, it is also feasible, in those situations where the existence of information in any of a plurality of categories of a single dimension is desired, to close or to operate a corresponding plurality of selecting means in that particular bank, and thereby utilize all of the necessary sensing heads simultaneously. Thus, if one dimension comprises five age groups, and it is desired to determine whether certain individuals having other characteristics lie within any of three age groups, then the appropriate three selecting means may be closed so that the occurrence of information in any of these three age groups is sensed together with the individual categories of other dimensions.

If it is desired not to sense any particular tape, but to take a reading of only the other tapes already set up, or to use fewer tapes than sensing heads, means must be provided to short circuit that particular bank of sensing heads. The bypass switches 336, 337, 338, 339 and 341, have been supplied to the banks of sensing heads for this purpose. Thus, if a tape has been inserted and has been scanned several times to produce the wanted combination of scans of the various dimensions and categories, but it is desired to remove that tape from further scanning for the additional runs to be made, then it is only necessary to close the appropriate switch 336–341 to bypass the tape, and in effect, remove it from consideration. The bypass switches effectively bypass or parallel an entire bank of heads, shorting out the heads to provide a continuous circuit through that portion of the device. When a group of perforations is simultaneously sensed to complete a circuit, current is permitted to flow from the source of electrical energy 382 through all of the sensing heads, switches, and counters. Since the tapes are moving, the circuit is completed for only a short period of time and is then broken by the passage of at least one tape between the brushes and their contact plates. Thus, the equivalent of a pulse of energy is allowed to pass through the individual counters to produce a single count thereon. The counters 322–325 are placed in individual lines adjacent individual scanning heads of the first bank, and they produce counts which represent the total coincidence of each scanning head 292–295 of the first bank with whatever individual combination of individual scanning heads has been selected in the other banks. In addition to these, a total counter 384 may be provided to produce the total number of positions at which coincidences are achieved during the entire scanning operation. A subtotal counter 383 may also be provided to produce the count of the total number of positions at which coincidence was reported during any single pass. The essential difference between the counter 383 and 384 is that the counter 383 could be reset at the end of each pass and the counter 384 would be reset only at the end of the entire operation. However, if desired, either counter may be provided with separate manual set means so that any combination of counts may be accumulated in either of these two counters.

Figure 19:
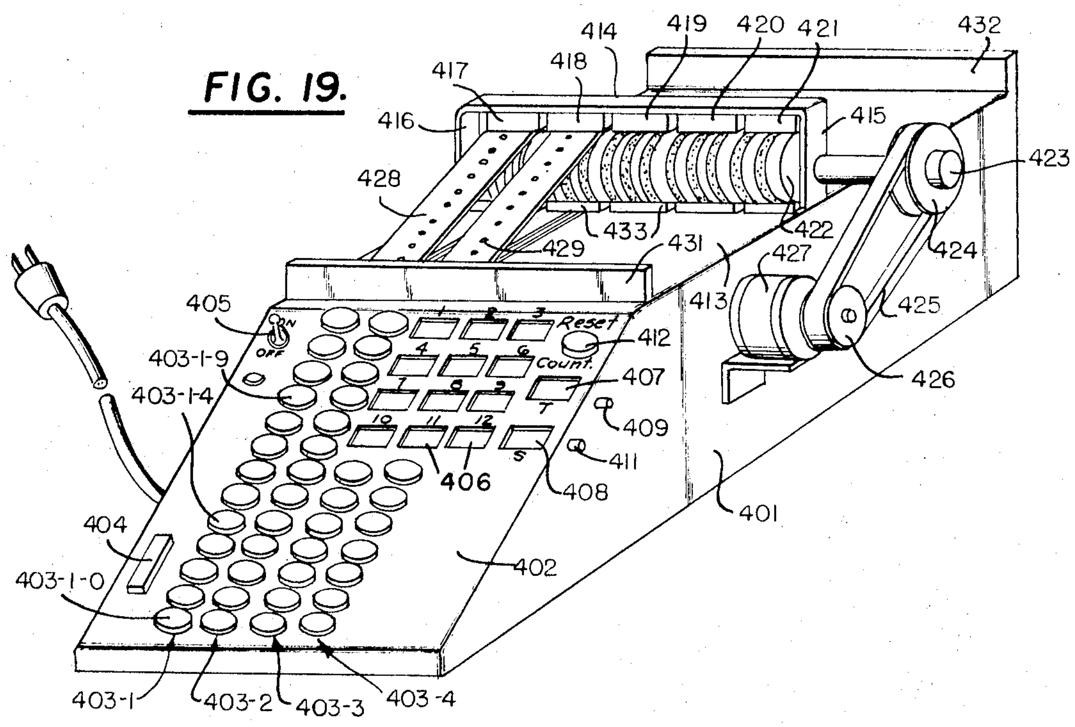
FIG. 19 is a perspective view of an automatic tape reader according to this invention.

The circuit illustrated in some detail in FIG. 18 can be used in the machine illustrated in FIG. 19. This device comprises a housing 401 having a sloped front panel 402 on which are a plurality of numbered keys arranged in rows and columns. These keys constitute a keyboard similar in construction to many of the well-known keyboards found on adding machines, calculators, and the like. The keys are arranged so that the depression of one key in a column releases all other keys in that column. The keyboard should have the further characteristic that two or more keys may be depressed simultaneously and remain depressed. One such keyboard is illustrated, by way of example, in FIG. 26, and is described below. In FIG. 19 the keys are generally numbered 403 with a column number and then a row number. For example, the column farthest to the left is column 403–1 and that farthest to the right is labelled 403–4. The bottom key in the column 403–1 is the number 1 key and is labelled 403–1–1 whereas the ninth key in that column is labelled 403–1–9. These reference characters are used only for identification purposes to enable identifying individual keys when or if necessary. In addition, the sloping front panel 402 contains windows 406 respectively numbered 1–12 through which the total count of the individual counters can be viewed. A reset button 412 is provided for resetting all of the counters 406. Two other windows 407 and 408 are provided for the total and subtotal counters, and buttons 409 and 411 are provided for the individual resetting of these two counters. In addition, on the front panel 402 is an on-off power switch 405 which is used to turn the equipment on or off as needed and a start button 404 for initiating individual scan operations. Also, the housing 401 contains a top panel 413 which is substantially horizontal and which supports a cross-member 414 mounted on two side brackets 415 and 416. A plurality of groups of scanning heads 417, 418, 419, 420 and 421, are shown mounted on the cross-member 414. Beneath the scanning heads is a drum or platen 422 supported for rotation on a shaft 423. A pulley 424 is also mounted on shaft 423 and is connected by a belt 425 to the pulley 426 of an electric motor 427 mounted on or in the housing 401. The perforated tapes to be sensed may be inserted between the heads 417–421 and the drum 422. The drum 422 comprises alternate portions, or rings of insulating and conductive material and also contains a sprocket gear at approximately the center of each of the tape members. Tapes 428 and 429 are shown in FIG. 19 interposed between the heads 418 and 417 and the cylinder 422. The sprocket holes only are shown on the tapes 428 and 429.

Figures 20, 31:
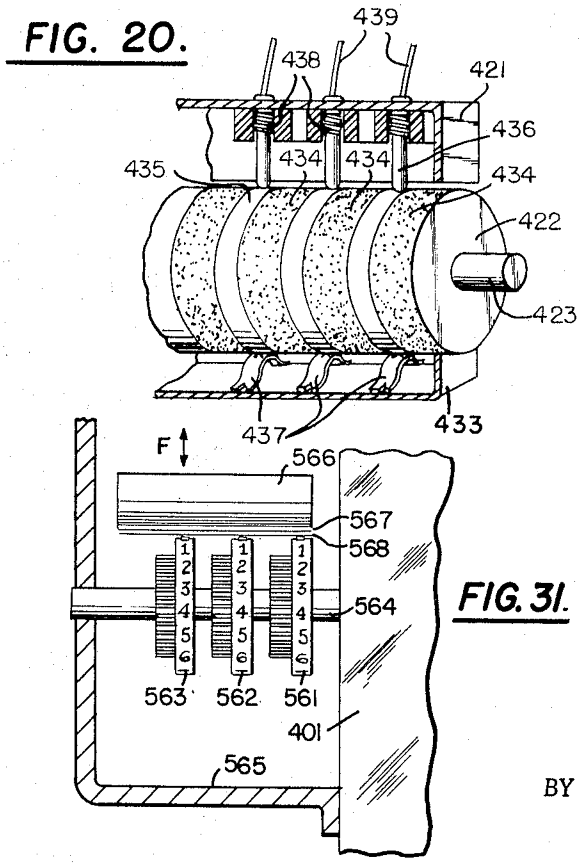
FIG. 20 is an enlarged view of a portion of the drum and the sensing means of FIG. 19.
FIG. 31 is an elevational view, partially in section, of the address counter arrangement for the system of FIG. 19.

To record the addresses on the tapes at which coincidences occur, the printing counter shown in FIG. 31 can be used. Printing counters are not new and have been used for many years and for a multitude of purposes. For this reason, FIG. 31 has been kept simple. A frame 565 is shown attached to the side of the housing 401 of FIG. 19. A shaft 564, supported by the frame 565 and the housing 401, is coupled in any suitable manner, such as by gearing or by belt drive similar to 424 and 425 of FIG. 19 to the drum 422 to rotate therewith. Three counter wheels 561, 562 and 563 are shown mounted on the shaft 464. An inked ribbon 568 and a paper tape 567 are interposed between the counter wheels 561–563 and a hammer 566. Actually, the counter wheel 561 is coupled to the shaft 564 and rotates with it. Suitable transfer mechanism, shown in FIG. 31 simply as gears 569, steps counter 562 one space for each revolution of counter 561, and steps counter 563 one space for each revolution of counter 562 in normal counter operation. The three counters 561–563 carry raised numerals on their outer surfaces. Whenever a pulse is generated by the apparatus of FIG. 19 to step the counter of that apparatus, that pulse also signals the hammer 566 to drive the paper tape 567 and ribbon 568 against the counters 561– 563. In this manner, a printed record is made of each address at which coincidence occurs in any combination of categories on the tapes 428, 429, etc. Since the construction and operation of printing counters is old, few details are shown in FIG. 31. However, if more details of such devices are desired, there are many descriptions in text books and patents. Reference may be had, by way of example, to United States Pat. 2,889,403.

FIG. 20 illustrates in greater detail the interrelationships of the parts of the sensing heads and brushes and the cylinder 422. For simplicity, and to avoid unnecessarily cluttering the drawing, no sprocket gear is shown. The drum or cylinder 422 comprises a group of discs 434 of plastic or other insulating material separated, at least at the surface, by rings 435 of conductive material, all of the rings 434 and 435 being mounted upon, but insulated from the shaft 423 to rotate therewith. Each of the sensing brushes 436 of the upper head 421 lies above and engages one of the conductive rings 435 on the cylinder 422. The brushes 436 are spring biased towards the drum 422 by individual compression springs 438 and are connected to external circuitry by means of wires 439. The lower head 433 may be constructed in a similar manner, or may comprise spring brush members 437 similar to those shown in FIG. 17*a*. Although no wires are shown for the lower head, it is understood that the brushes of the lower head are also connected to an external circuitry by means of individual wires. The drum 422 may be formed in any of several ways. For example, the drum itself could be cast or otherwise fashioned from insulating material such as a synthetic resin, glass, asbestos fibre and the like and may have rings of metal placed in formed grooves on the surface. Or, the cylinder 422 could be formed of discs of insulating material 434 and conductive material 435 sandwiched together by means of a central core 423 of insulating material or other such connecting means. An alternative means for connecting together the individual layers of alternate nonconductive and conductive material which has been suggested is by means of snap fasteners. One advantage of this last mentioned means is the ease with which a drum or cylinder can be added to and increased in length as the capacity of the device grows. However, care must be taken to provide the fasteners with keys and keyways to ensure positive and synchronous rotation of all the sprockets.

Considering the operation of the machine of FIG. 19, the prior discussions must be borne in mind. The tapes selected for review and study are inserted beneath the heads 417–421 mounted on the bridge member 414. This may be accomplished by providing a hinge (not shown) at one end of the bridge 414 on one of the upright supports 415 or 416 so that the heads 417–421 and the bridge member 414 may be lifted to allow placement or removal of the tapes in the machine. When the tapes have been inserted in the machine in the manner in which tapes 428 and 429 are shown and the forward positions of the tapes have been synchronized and properly aligned as by alignment pins 261 and notches in the forward end of the tapes, the scanning operations may be begun. Scanning is initiated by depression of the start button 404. Of course, this assumes that the switch 405 has been placed in the on position and that the equipment is energized and in operable condition. In addition, all of the counters 406, 407 and 408 should have been reset to zero. Prior to the depression of the start button 404, the categories on each tape to be scanned (except for the tape at the left) at any particular scan are selected by depression of the proper keys 403 on the panel board 402. This is assuming that, in the device shown, five tapes are to be scanned. Consider, that the number one category or column on each of the tapes is to be scanned on the particular run in question. Then, the number 1 key of all of the columns 403–1 through 403–4 are depressed. The depression of these keys closes the corresponding switches shown in the circuit diagram of FIG. 18. In this case, the switches 332, 342, 352 and 362 would be closed. Since, as mentioned in the discussion of FIG. 18, no selection switches are used for the left-hand tape, only four columns of keys and switches are provided for five tapes.

Figure 21:
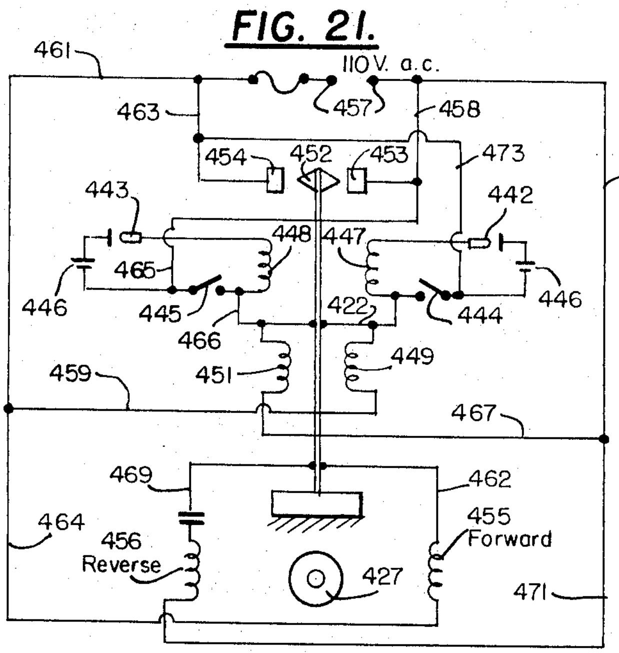
FIG. 21 is a schematic diagram of the drive motor circuit of the reader of FIG. 19.

In order to save time of reading in the recovery of information, the device of FIG. 19 is designed to read information in both the forward and the reverse direction. One possible circuit for accomplishing the forward and reverse motor drive is illustrated in FIG. 21. As mentioned earlier, in connection with the description of FIG. 16, a notch 271 is provided in the forward and back ends of the information being scanned to provide a means for ensuring that the proper portion of tape is under the reading head prior to the operation of a scan. In FIG. 21 the forward sensing pin is designated 442 and the reverse sensing pin is 443. When tape is between the sensing pin 442 and its associated platen, it serves as an insulator and prevents the energization of the relay circuit to initiate forward operation. In a similar manner, when the tape is interposed between the reverse sensing pin 443 and its associated plate or ring, the reverse starting circuit is not closed. From this it can be seen that the only time the apparatus can be started when the tapes are in the machine is when either of the forward or reverse notches 271 in FIG. 16 are beneath their appropriate sensing pins. When the notch 271 is properly positioned, then momentary depression of a forward start button closes switch 444 and a circuit is completed from a battery 446 or source of electrical energy through the sensing pin 442 and its plate, the forward switch 444 and a forward relay coil 447. The relay coil 447 is thus energized, causing a relay reed 452 to be attracted to the right and to make contact with a stationary contact 453. When the contact mounted on the relay reed 452 meets the stationary contact 453, a circuit is completed from the terminals 457, which are adapted to be connected to any standard source of electrical energy such as a commercial source of 110 volts-60 cycle current, through line 458, stationary contact 453, relay reed 452, a forward hold coil 449, line 459, and line 461 to the other terminal 457, energizing the forward hold relay hold coil 449 to maintain the reed 452 in the displaced position. At the same time, a motor circuit is completed from one side of the 110 volt line through a line 458, stationary contact 453, reed 452, line 562, forward motor start coil 455, line 464, and line 461 to the other side of the 110 volt source. Thus, when the notch 271 is beneath the sensing pin 442 and the forward start switch 444 is closed, the relay 452 is closed in the forward position energizing the motor 427 in the forward direction. There is only one notch 271 on one edge of any tape. The reverse notch is on the other edge of the tape and is located at the back end of the recorded information. In this manner, the same notch is not sensed for forward and reverse direction. In addition to being a sensing notch, the notches may also be used for stop purposes. The reverse notch, not shown, is cut into the edge of the tape immediately behind the end of the information recorded thereon. When the tape has been scanned, and the reverse notch passes beneath the sensing pin 443, that pin moves into contact with its plate closing a circuit from the battery 446 or other source of electrical energy, through a line 465, the contact 453, the reed 452, line 466, and relay reverse relay coil 448. The energization of the relay coil 448 is sufficient to overcome the effect of the forward holding coil 449 and allow the flexible and resilient reed 452 to spring back into its neutral position, breaking the circuit through the pin 443 and also the forward drive circuit through the forward start coil 455. At this point the operator records the information contained on the counters seen through the windows 406 of FIG. 19 and resets the counters. He then selects the next combination of categories to be scanned by depressing the appropriate buttons 403 on the panel board 402. Depression of the start button 404 closes both the forward and the reverse start switches 444 and 445. This can be accomplished by positioning the forward and reverse start switches 444 and 445 adjacent each other under a long bar 404 so that depression of the start button 404 closes both switches simultaneously. Only one circuit at a time is completed since only one notch, either the forward or the reverse, appears under one of the sensing pins 442 or 443. In the position of the tape after the first scan, the notch appears beneath the sensing pin 443 allowing that pin to complete its circuit, and the tape is interposed between the sensing pin 442 and its plate to prevent closing of that circuit. Depressing the start button 404 closes the reverse switch 445, completing the circuit from the battery or other electrical source 446, through the switch 445, the reverse relay coil 448, and the sensing pin 443. The reed is attracted to the left contacting the stationary contact 454. This establishes a holding circuit from one side of the 110 volt source, through line 463, stationary contact 454, relay reed 452, line 466, reverse holding coil 451, line 467 and line 468 back to the other side of the 110 volt source. In addition, a circuit is completed from one side of the 110 volt source through line 463, stationary contact 454, relay reed 452, line 469, through the reverse motor coils 456, line 471, line 468 to the other side of the 110 volt source, causing the motor 427 to rotate in the reverse direction. When the tapes have been scanned in the reverse direction, the notch 271 again appears beneath the sensing pin 442 allowing that pin to make contact with its plate and momentarily closing the circuit through the forward coil from one side of the source 446, through line 473, stationary contact 454, relay reed 452, line 422, forward relay coil 447, and sensing pin 442 to the other side of the source 446. The energization of the forward relay coil 447 effectively overcomes the effect of the reverse holding coil 451, allowing the relay reed 452 to spring into its neutral position and opening the motor circuit. The motor 427 then comes to a stop and the sensing is halted. At this time, the operator records the information visible through the counter windows 406 in FIG. 19, resets the counters, and prepares for the next scan. In this manner, all of the various combinations of categories are scanned automatically by operation of the tape in either direction through the machine.

As the tapes pass between the roller 422 and the scanning head, for example at 421 in FIG. 20, the spring biased sensing pins 436 penetrate the perforations in the tape and make momentary contact with the metal slip rings 435 therebeneath. The lower heads 433 are provided to allow the circuits from the slip rings 435 to be completed to external circuitry. Under normal circumstances, the lower brush members 437 will always be biased into contact with the slip rings 435 by means of their bowed construction of resilient material and an electrical circuit therebetween will always be completed. Thus, the contacting of the individual rings 435 by the sensing pins 436 are necessary to complete the circuit in any particular category.

Figure 22:
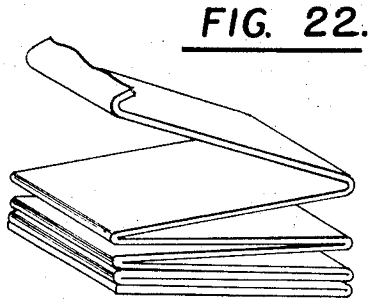
FIG. 22 is a perspective view of a stack of folded recording tape for the reader of FIG. 19.

Rather than provide reels for holding the tape, supplying it and taking it up as it is scanned, it is simpler to provide prefolded tape in the manner shown in FIG. 22. Thus, as the tape is being discharged from between the head 417–421 and the roller 422, the leading edge of the tape will hit one of the stops 431 or 432 and begin piling up on the top 413. As one layer falls on the top 413 a preformed fold should reach just beneath or adjacent the drum 422 and the tape should begin then folding again toward the stop. As the edge of the tape being discharged reaches the stop, another preformed fold should appear allowing the tape again to fall toward the drum. In this manner, the tape may be filed in a flat position occupying little space and providing an easy means for recovering it, and yet serve a suitable means for passage through the equipment. However, it should be understood that reels could be used for storing tapes, in which case, the apparatus should be adapted for driving the takeup reel. Or, short lengths of tape may be provided precurled which would automatically curl on the discharge side of the drum. Since the end of the tape never leaves a position between the drum and the head when the machine is operating properly, the tape is merely moved forward and backward until all scanning is completed, and then is removed. Because of this, it is seldom necessary to worry about the end coming free of the drum, and once threaded, it remains properly positioned throughout the scanning operation. Or, particularly for short tapes, the tape may be scanned flat. In other words, the tapes are placed between the heads and the drum and the machine is started, As the tape is discharged it merely drops down toward the floor in either the front end of the machine or the back end of the machine. This is quite feasible for desk type machines where the tape is less than three feet long. In addition, these tapes may have an end member attached thereto for key sorting purposes, and the tape may be stored hanging, clamped between a pair of resilient members. The storage problem becomes fairly simple in a case like that. To ensure alignment of the tapes as they repeatedly pass between the heads and the drum, and to prevent skewing of the tape, vertical partitions or guides (not shown) may be provided on the top portion 413 on one or both sides of the drum. As indicated above in the description of FIG. 31, the addresses at which pulses are generated in any combination of categories may be printed by means of printing counters such as 561–563 driven from the shaft 564. Since all of the tapes 428, 429, etc. are "zeroed" by the start and stop notches such as shown in FIG. 16 at 271, the counters 561–563 can always show the correct address. Or, a printing counter can be driven by the sprocket wheels 266–268 of FIG. 16 to count sprocket teeth as they pass. Such address counters have been used with film and tape in the past.

The above text has clearly defined information storage and retrieval systems which provide tabulations of various combinations of data in all of their combinations. To this point, it has been assumed that the information stored in the system was placed there by some well-known but not described means. A comparatively simple writer for the system of this invention is illustrated in FIGS. 23, 24, 25 and 26. A punch for recording information upon the tape used in the apparatus of FIGS. 16–22 comprises a base 501 which may be made of any suitable structural material such as wood, metal, synthetic resin, and the like. A platform 502, having punched die holes formed through a portion thereof, is supported on the base 501 by legs 503 and 504. Punches 507, cooperating with the die holes 506, are supported on a bridge 505 which is mounted on the base 501 and straddles the platform 502. Side guide rails 514 on the platform 502 serve to keep a tape being perforated from moving sideways off the platform, and a sprocket wheel 508, driven by a pawl 509 operated by a solenoid 511, all of which are more clearly shown in FIG. 24, penetrates the platform 502 and steps the tape being perforated. The bridge 505 has mounted in its top portion, a plurality of solenoids 516 in which the punches 507 are carried, and the bridge 505 also supports a printing counter 517 which is placed adjacent one edge of the platform 502 to imprint the edge of the tape. At one end of the platform 502 and along its edge is an alignment notch punch 515.

Figure 23:
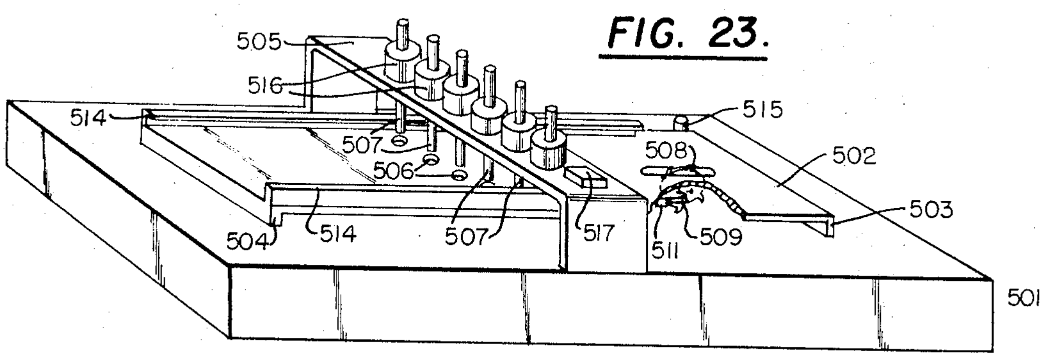
FIG. 23 is a perspective view of a writer of the perforated tape used in the reader of FIG. 19.

Although the operation of the device of FIG. 23 is clear from the drawing, it should be pointed out that the tape is placed upon the bed 502 with its leading edge adjacent the alignment punch 515. The distance between the alignment punch 515 and the die holes 506 is such that when the tape is sensed, the first set of positions to be sensed will be in sensing position when the tape is aligned with the alignment pin 261. There is only one punching station in this apparatus, and as one position is punched, the tape is moved to the next position for punching. At this one punching station there are a plurality of aligned punches 507, one for each category of the dimension being recorded. Ordinarily, only one category is perforated at any writing position, but accasionally, more than one category may be used; therefore, the punches 507 must be capable of combined as well as single operation. The printing counter 517 registers a count whenever the tape is moved to the next position and prints the total at each position, thereby clearly indicating the subject number in written form. Additional printing counters may be used, or the single counter may be positioned to imprint the tape at any transverse location.

Figures 24, 25:
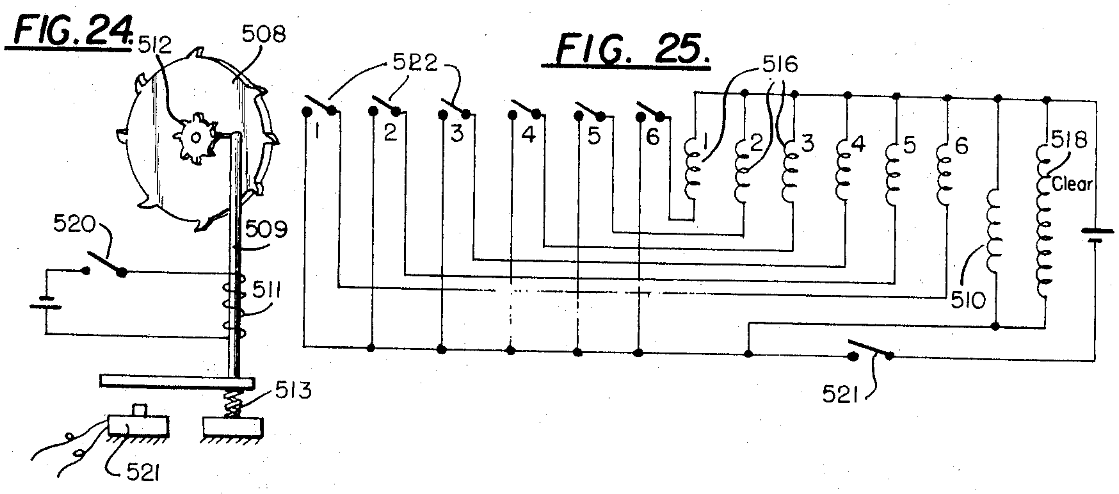
FIG. 24 is a detailed view of the sprocket wheel and its drive for the writer of FIG. 23.
FIG. 25 is a schematic diagram of the circuit for the punches of the writer of FIG. 23.

As shown in FIG. 24, the sprocket 508 which steps the tape to its successive punching positions has attached to it a ratchet gear 512 which is engaged by a pawl 509. The pawl 509 is actuated by a solenoid 511, which is energized from a source of electrical energy such as a battery, by the closing of a switch 520, which may be a simple push-button switch. The pawl 509 is biased toward its one position by a spring 513 against which the solenoid operates. A switch 521 is closed when the pawl 509 has operated to move the tape to its next recording position.

Figure 26:
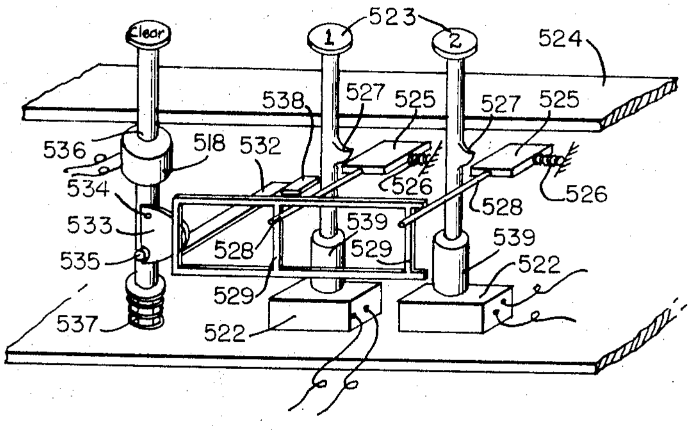
FIG. 26 is an enlarged detail view of a portion of a keyboard for the writer of FIG. 23.

The individual punches are selected for operation by the depression of keys on a keyboard. Each key operates its respective selection switch 522 in FIGS. 25 and 26. The keyboard should be so constructed, as shown in FIG. 26, that the depressed keys remain depressed until released, and thereby maintain the corresponding switches in closed position until the keys are released. Each solenoid 516 has one end connected to one of the switches 522, and the other end of all of the selection switches 522 are connected together and to one of the switch 521. The other end of the switch 521 is connected to one side of a source of electrical energy such as battery 519, the other side of which is connected to all of the other sides of the solenoids 516. A clear solenoid 518 and the counter solenoid 510 are connected across the switch 521 and the battery 519.

In operation, the tape to be perforated is positioned on the platform 502 with the sprocket wheel 508 penetrating one of the sprocket holes in the tape. The wedge-shaped punch 515 is then operated to provide the tape with the alignment notch, and the apparatus is then ready for the actual recording of information. The category to be recorded in the first position is selected from a chart or other source of information and the corresponding key is depressed. This closes the selection switch 522 associated with that key, preparing the apparatus for punching. Closing of the switch 520, which can be designated a master switch, energizes the solenoid 511 to operate the tape stepping mechanism and sprocket 508. As the pawl 509 reaches the end of its travel and when the tape has come to rest, the switch 521 is closed by the extension on the bottom of the pawl 509. This completes the circuit from the battery 519, through the switch 521, the selected switch 522 and the associated solenoid 516 to the battery 519. The selected punch is operated by the energized solenoid 516 and the tape is thereby perforated. At the same time that the punch is operated, the print solenoid 510 and the clear solenoid 518 are also energized, causing stepping and printing of the counter and actuation of a clear key 536, which releases the depressed keys 523 and restores the equipment to its former condition.

One form which the keyboard can assume is illustrated in FIG. 26. The keyboard may be any standard keyboard which meets the following conditions. When a key is depressed, it must remain in the depressed condition until it is released. Several keys may be depressed simultaneously, and when depressed simultaneously, will remain depressed. However, the depression of a second key after the earlier depression of a first key releases the first key. And a clear key should operate to clear the keyboard before or after the punching operation. The portion of the keyboard shown in FIG. 26 meets these requirements. A plurality of keys 523 penetrate openings in a panel board 524 which may be formed of wood, plastic, or other suitable material. Beneath the panel 524 are positioned a plurality of latch members 525 which are individual to each key. Each key has a projection 527 with a sloping lower cam surface, the projections of each key engaging the latch associated with that key to retain the key in a depressed position. The latches are retained in their locking position by springs 526 which are interposed between the latches 525 and a portion of the housing containing the mechanism (not shown). Each latch has a trip bar 528 which extends longitudinally from the latch and passes between the rungs 529 of a release ladder 531. A release member 532 at one end of the ladder 531 is engaged by a pivoted nose 533 eccentrically mounted on a pivot 534 which is carried on a clear key 536. The bottom portion of the nose 533 bears against a stop member 535 mounted on the shaft of the clear key 536. The clear solenoid 518 surrounds a magnetic portion of the shaft of the clear key 536 to operate that key against the action of a compression spring 537. Selection switches 522 are mounted beneath each of the keys 523 and have upwardly biased operating plungers 539 which are moved by the bottom ends of the depressed keys 523.

The operation of the entire writer may now be considered. A tape upon which information is to be recorded is placed upon the bed 502 with a sprocket hole engaging the protruding tooth of the sprocket wheel 508. The notching punch 515 is then operated to punch a notch in the edge of the forward portion of the tape so that the tape may be later aligned for proper operation in the reader. When the tape has been situated on the bed 502 between the side rails 514 and has been aligned with the sprocket wheel 508 and the punch 515, it is in condition for the recording of information. As shown in the drawings, the tape of this particular example may contain up to five different categories of a single dimension, but this number has been chosen for explanatory purposes only, and it should be understood that any desired number of categories may be used, enlarging the width of the tape and/or decreasing the size of the perforations, if necessary. The particular category to be recorded in the first subject position is selected by depressing the key 523 which corresponds to that category. After the operator has assured himself that the selection made is correct, the master switch 520 is closed. This energizes the solenoid 511 to step the sprocket wheel 508 and the tape one space. When the pawl 509 has reached the end of its travel in stepping the sprocket wheel 508, it operates to close switch 521, which completes the circuit through the selected switch 522, corresponding solenoid 516, battery 519 and switch 521, causing the energized solenoid 516 to operate its punch 507 and record the selected information on the tape. At the same time, the counter solenoid 510 and the clear solenoid 518 are energized, causing the imprinting of the counter reading on the tape and the depression of the clear key 536. As the key 536 descends, the nose 533 is rotated about the pivot 534 until it moves clear of the release member 532. When the key 536 near the end of its downward travel, the nose 533 moves free of the reelase member 532 and drops down until it abuts the stop 535. Since the nose 533 is mounted eccentrically, its weight alone will cause it to drop until it is halted by the stop 535.

The master switch 520 is a push button, and is only momentarily closed. When it is released and the switch 520 opens, the pawl 509 is driven upwardly by the spring 513. During its upward travel, the pivoted top portion of the pawl 509 rotates counterclockwise until it clears the next tooth on the ratchet 512, and the elongated arm at the bottom of the pawl 509 moves away from the switch 521, allowing that switch to open. When the switch 521 opens, the circuit through the punch solenoids 516 and the clear solenoid 518 is broken, allowing the clear key 536 to be moved upwardly by the spring 537. As the nose 533 moves upwardly, its upper cam surface bears against the release member 532, forcing it toward the right (as shown). Since the nose 533 is prevented by the stop 535 from rotating clockwise, the release member 532 is forced to the right, moving the ladder 531 with it. The ladder 531 engages the trip bars 528 and moves them toward the right together with the latches 525, against the concerted actions of the springs 526. The depressed keys 523 are released and are then forced upwardly by the plungers 539, and the equipment is restored to its operating condition ready for the next recording operation.

Once the master switch 520 is depressed, the operation of the equipment proceeds automatically and without interruption. Until the master switch is depressed, the operator may clear the keyboard merely by depressing the clear key 536, or if he notes that a wrong channel has been selected, he may clear the particular incorrect key by depressing the correct key, thereby forcing the ladder 529 to the right and releasing the prior depressed key. Therefore, the keyboard is designed so that any number of incorrect and correct key depressions may be performed without initiating operation of the punch until the operator is satisfied that the correct selection has been made, then operation is initiated by closing the master switch 520.

Figure 29:
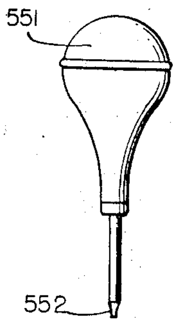
FIG. 29 is an elevational view of a manual punch for use with the writer of FIG. 27.
Figure 27:
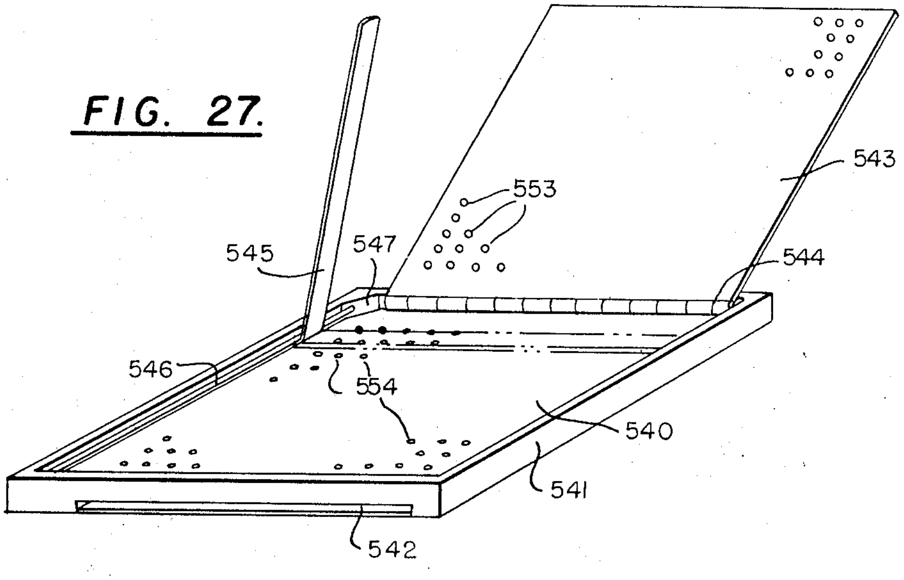
FIG. 27 is a perspective view of a writer for the card used with the retrieval device of FIGS. 4 and 13.
Figures 28, 30:
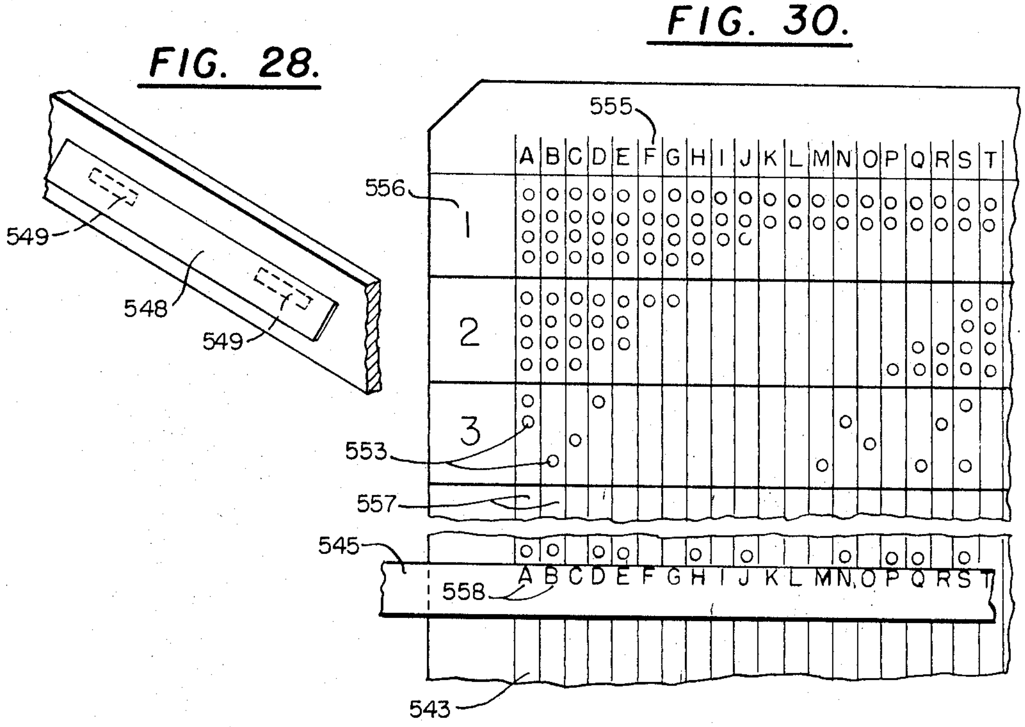
FIG. 28 is an enlarged view of a detail of the wall construction of the writer of FIG. 27.
FIG. 30 is a plan view of a portion of the cover and slide members of the writer of FIG. 27.

The writer illustrated in FIGS. 23 through 26 provides one means for recording information on tapes which can be read by the readers of FIG. 19. A simple and inexpensive writer for recording information on the cards used in the readers of FIGS. 4–15 is shown in FIGS. 27–30. The writer comprises a housing 541 having a perforated top surface 540 in which the perforations 554 are punch dies. A slidable tray member 542 mounted in the bottom portion of the housing 541 provides a convenient means for removing accumulated bits of punched-out material. A perforated cover 543 is mounted pivotally on a hinge 544 at one side of the housing 541, the perforations 553 in the cover 543 being sligned with the perforations 554 in the top surface 540 and serving as guides for the punch. Once corner of the housing 541 is provided with a fillet or insert 547 which serves as an orientation device for the record receiver. A rod 546 is mounted at one side of the top of the housing 541 and at right angles to the hinge 544. An elongated ruler guide 545 is rotatably and slidably mounted on the rod 546. To ensure that the record receiver is properly positioned in the top surface 540, at least one side of the housing 541 has portion 548 biased by springs 549 as shown in FIG. 28. The punch may be a manual member comprising a handle portion 551 and a punch portion 552 as shown in FIG. 29. The cover 543 is better shown in FIG. 30 where the coordinates for the columns and rows can be seen. As mentioned above, information is recorded on the record receiver in horizontal rows, wherein the location of the individual subjects may be identified by indicia appropriately located on the edges of the card or other portion of the apparatus. Information is recorded in groups of horizontal rows in the fashion of a folded scale where each group of horizontal rows represents a continuation of the group of horizontal rows immediately preceeding it and wherein each row in a group of rows represents a single category of the dimension recorded on the card. In FIG. 30, the cover 543 has a plurality of perforations 553 which are aligned with the perforations 554 of the top surface 540. The cover 543 has indicia 555 for identifying the individual columns, and indicia 556 for labeling the individual groups of rows, so that the position of any particular subject may be identified by the indicia 556 of a group of rows and by the indicia 555 representative of a column location. In addition, the slide member 545 also has marks on its surface for indicating the horizontal location of the individual subjects.

In operation, a record receiver of any suitable stock and shaped with one corner removed to match the fillet 547 is inserted into the housing 541 on the top surface 540. The portion 548 is moved out of the way of the record receiver against the action of the springs 549 as the record receiver is being inserted, but when the record receiver is in position, the springs 549 urge the portion 548 against the side of the record receiver to move it firmly against the opposite wall. With the spring biased portions mounted on a side and an end wall of the housing 541, the record receiver would always be urged into the same position with respect to the top surface. The cover member 543 is then lowered to cover the record receiver and the slide member 545 is lowered over a portion of the cover member 543. The slide member is positioned immediately below the group of rows in which information is to be recorded at that time, and serves as a memory to identify the group of rows being recorded. In addition, the indicia impressed upon the cover member 543 serves as a guide for the operator who is recording the information. Since the act of manual recording requires that the operator take his eyes from the recording to glance at the source of information for the information next to be recorded, it is important that there be an easy means for indicating the position of the last information recorded. The slide member 545 is moved to a position immediately below the group of horizontal rows in which information is being recorded and serves to identify that group even if the operator is required to leave the apparatus for a period of time. The individual subjects can be identified, if desired, by the indicia 555 and 556 on both the source of the information and on the cover member 543. The appropriate perforation 553 is then penetrated by the punch end 552 of the tool of FIG. 29, and the record receiver is punched at that position. To aid the operator in properly positioning the punch, the perforations 553 in the cover member 543 may be larger at their top portions and taper down to the size of the punch die perforations 554 at the top surface 540 of the housing 541. After a large number of recordings have been made, the housing 541 may be cleaned by the removal of the slidable tray 542.

The above specification has described and illustrated a new and improved information storage and retrieval system in which information may be stored for later recovery and in which the recovery of information may be easily and readily related with other stored information. In the system described, information is recorded in accordance with a classification different from the normal method of storage. In this system, individual record receivers are designated in accordance with the types of the information to be stored and the particular subjects having those characteristics are recorded upon the appropriate record receivers. Each type of information may comprise a plurality of subtypes, and the record receiver representative of each type of information has thereon provisions for recording those subtypes of the type represented by the record receiver. Thus, by the proper correlation of separate record receivers, the simultaneous occurrence of all the combinations of the different subtypes of information of the characteristics represented by the selected record receivers are readily determined. The equipment disclosed and described hereinabove is simple in its construction and accurate in its operation and provides an inexpensive tool for use by those engaged in many forms of research, those engaged in the classification and designation of information, and those working in statistics. It is realized that the above specification may indicate to those skilled in the art, other forms in which the principles of this invention may be used without departing from this invention. It is, therefore, intended that that invention be limited only by the scope of the appended claims.

What is claimed is:

1. A data processing system in which information is recorded upon record receivers each of which is representative of individual dimensions which characterize subjects being studied, each dimension comprising several categories each of which have assigned separate areas of recording on each of the record receivers, the individual subject being studied being assigned the same relative positions on all of the record receivers, means for reading said record receivers, said reading means comprising individual supports for each record receiver, means for simultaneously sensing the recordings on all of a plurality of record receivers, said sensing means scanning said areas of said record receivers in a prescribed pattern, and means for positioning each of said record receivers with respect to the other record receivers being read to provide the reading of a plurality of combinations of said areas on all of said reocrd receivers being read.

2. A data processing system for storing information upon individual record receivers which represent individual dimensions, each record receiver being divided into areas which represent the various categories of the dimension represented by the record receiver, said information being stored as bits which represent the subjects characterized by the individual category, the same subject being assigned the same relative bit position in each area, means for reading a plurality of said record receivers simultaneously, said reading means comprising individual supports for individual record receivers, sensing means adapted to scan said record receivers in a prescribed pattern, and means for positioning said individual supports so that said record receivers may be read in a selected combination of categories each time said sensing means scans the record receivers in its pattern to produce outputs which are indicative of the subjects conforming to the selected combinations of categories in all of the dimensions being read.

3. A data processing system in which information of individual subjects is stored as bits on record receivers which represent dimensions, each of said record receivers being divided into areas unique to a category of the dimension represented by the record receiver, said subjects being assigned the same relative recording positions in each area on each record receiver, a device comprising means for simultaneously scanning the recording fields of a plurality of said record receivers in a prescribed pattern, individual means for supporting a plurality of record receivers for simultaneously reading, each of said support means being movable to any of a plurality of defined positions, said plurality of positions being equal to the number of areas into which said record receivers have been divided, and means for indicating the relative positions of each of said support means whereby said record receivers may be placed into any of a plurality of combinations of relative positions so that a selected combination of categories is read when said reading means scans said record receivers.

4. A data processing system in which information is recorded on a plurality of record receivers each of which represents a single dimension, all of said record receivers relating to the same subjects, each record receiver having separate portions representative of individual categories of that dimension represented by the record receiver, the information being recorded on said record receivers in positions which are assigned to the same subjects in each portion of each record receiver, said system comprising means for retrieving said recorded information, said retrieving means comprising support means for a plurality of record receivers, means for simultaneously reading selected portions of said plurality of record receivers carried by said support means, including means for selectively changing the combinations of the portions being read, means for correlating the outputs from said reading means to produce composite data of the information retrieved from a selected combination of categories at any time, and means for indicating said composite data.

5. A data processing system in which information is recorded on a plurality of record receivers which are individually representative of any one of several dimensions by which a group of subjects may be characterized, each dimension comprising a plurality of separate categories which are individually represented by discrete portions of the individual record receivers, the same subjects being assigned the same relative position in each portion of each record receiver, said system including apparatus for simultaneously reading information recorded on a plurality of said record receivers to indicate which subjects are characterized by all of the categories in any combination of categories represented on the plurality of record receivers being read at any time, said apparatus comprising a base for supporting a plurality of record receivers, a plurality of means for sensing individual recordings on each record receiver, each of said sensing means being located to sense the recordings in that portion of a record receiver which is assigned to one category, means for moving in synchronism all of the record receivers supported on said base past their respective sensing means, and means for connecting together selected sensing means to select any combination of categories to be read at any time.

6. The system defined in claim 5 wherein said record receivers comprise elongated strips on which the individual subject positions are sequentially located longitudinally along said strips and which strips are divided laterally into separate portions representative of the categories which comprise the dimension represented by the record receiver.

7. The system defined in claim 6 wherein said base comprises means for positively driving all of said strips in synchronism whereby sequential positions assigned to the same subjects in the various categories of the various dimensions pass by the respective sensing means simultaneously.

8. The system defined in claim 7 further including means connected in series with the selected sensing means to count the number of subject positions which contain recordings in all of the selected categories.

9. The system defined in claim 8 wherein said counting means is adapted to print its reading when appropriately energized.

10. The system defined in claim 7 further including means for recording the address of each subject position which contains recordings in all of the selected categories of the various dimensions being read.

11. The system defined in claim 10 wherein said address means is driven in synchronism with said strip driving means whereby the address of the position passing the sensing means is indicated, and further including means responsive to the sensing of recordings in all of the categories to cause said address means to record its reading.

12. The system defined in claim 10 wherein said address means is driven in synchronism with said strip driving means so that said address means indicates at all times the address of the positions passing the sensing means, and further including means responsive to the sensing of recordings at any position in all of the selected categories of the various dimensions being read to cause said address means to record its reading at that time.

13. The system defined in claim 7 further including means to align the several strips to be read prior to the sensing of said strips to ensure that position assigned to the same subject is driven past the several sensing means at the same time.

14. The system defined in claim 12 wherein the recordings made on said strips comprise individual perforations at the location assigned to an individual and in the portion representing the category into which the individual falls, said sensing means comprising electrical switching means for sensing individual perforations.

15. The system defined in claim 14 wherein a separate sensing means is provided for each category, all of the sensing means for the categories of a given dimension being connected in parallel into groups, the groups of sensing means being connected in series, and means for providing the series arrangement of sensing means with electrical energy.

16. The system defined in claim 15 further including selection means for each individual sensing means for selecting which of the sensing means in any group is active in any individual reading, the selection means being arranged to prevent the effective sensing of perforations by any but those sensing means selected.

17. A system for processing data in which information is recorded on record receivers in the form of individual recordings made at positions assigned to individual subjects, each record receiver being representative of a given dimension, each dimension comprising a plurality of categories, each record receiver being divided into separate portions for each category of the dimension which that record receiver represents and having the same relative locations in each category assigned to the same individual subject, said system including means for supporting a plurality of individual record receivers in any of a plurality of precisely determinable positions, means for moving said record receivers from one combination of said positions to another, and means for simultaneously reading the recordings in all of said record receivers being supported in any combination of said positions to determine those subjects common to each combination of categories.

18. System for processing data in which information is recorded on record receivers in the form of individual recordings made at positions assigned to individual subjects, each record receiver being representative of a given dimension, each dimension comprising a plurality of categories, each record receiver being divided into separate portions for each category of the dimension which that record receiver represents and having the same relative locations in each category assigned to the same individual subject, said system including means for supporting a plurality of individual record receivers in any of a plurality of precisely determinable positions, means for moving said record receivers individually from one combination of said positions to another, means for simultaneously reading the recordings in all of said record receivers being supported in any combination of said positions to determine those subjects common to each combination of categories, means for guiding said sensing means over said record receivers in a prescribed pattern, and counting means responsive to the simultaneous sensing of recordings in the same relative locations in all of the record receivers being read in any combination of positions for indicating the total number of simultaneous recordings in each of said combinations.

19. The system defined in claim 18 wherein said sensing means comprises a plurality of separately movable scanning elements, each of said elements being movable in its own prescribed path.

20. The system defined in claim 19 wherein said scanning elements are sequentially movable in their individual paths to effectively scan all of the locations having recordings therein in any of said combinations.

21. The system defined in claim 20 further including means for automatically initiating each of said scanning elements in its scan at the end of the scan of the immediately preceding element.

References Cited

UNITED STATES PATENTS

| | | | |
|---|---|---|---|
| 2,803,178 | 8/1957 | Lotz. | |
| 2,755,996 | 7/1956 | Williams | 235—61.115 |
| 2,687,253 | 8/1954 | McMillan | 235—61.115 |
| 2,953,300 | 9/1960 | Obrien | 235—61.12 |
| 1,853,443 | 4/1932 | Maul | 235—61.12 |
| 2,993,642 | 7/1961 | Fender | 234—37 |
| 2,228,464 | 1/1941 | Kraft | 234—37 |
| 2,558,577 | 6/1951 | Myers | 179—18 |
| 2,668,877 | 2/1954 | Gent | 179—18 |
| 2,755,996 | 7/1956 | Williams | 235—61.11 |
| 2,803,178 | 8/1957 | Lotz | 95—4.5 |
| 2,832,412 | 4/1958 | Bellinger | 164—112 |
| 2,989,697 | 6/1961 | Gilz | 324—83 |
| 3,206,724 | 9/1965 | Stahl | 340—146.2 |
| 2,704,634 | 3/1955 | Rauch | 235—61.115 |

DARYL W. COOK, Primary Examiner